(12) United States Patent
Rutherford

(10) Patent No.: US 10,768,613 B2
(45) Date of Patent: Sep. 8, 2020

(54) METHODS AND SYSTEMS FOR STREAMING NON-PROCESS EVENT DATA TO COMPUTING DEVICES

(71) Applicant: FISHER-ROSEMOUNT SYSTEMS, INC., Round Rock, TX (US)

(72) Inventor: Shawn M. Rutherford, Bastrop, TX (US)

(73) Assignee: FISHER-ROSEMOUNT SYSTEMS, INC., Round Rock, TX (US)

(*) Notice: Subject to any disclaimer, the term of this patent is extended or adjusted under 35 U.S.C. 154(b) by 8 days.

(21) Appl. No.: 16/158,907

(22) Filed: Oct. 12, 2018

(65) Prior Publication Data

US 2020/0117178 A1    Apr. 16, 2020

(51) Int. Cl.
  *G05B 23/02*    (2006.01)
  *G05B 19/418*   (2006.01)

(52) U.S. Cl.
  CPC ..... *G05B 23/0216* (2013.01); *G05B 19/4185* (2013.01)

(58) Field of Classification Search
  CPC .................. G05B 23/0216; G05B 19/4185
  See application file for complete search history.

(56) References Cited

U.S. PATENT DOCUMENTS

| | | | |
|---|---|---|---|
| 10,180,681 B2 * | 1/2019 | Nixon | G05B 23/0216 |
| 10,410,145 B2 * | 9/2019 | Dillon | G06Q 10/06311 |
| 2009/0295587 A1 * | 12/2009 | Gorman, Jr. | G01W 1/16 |
| | | | 340/601 |
| 2010/0013629 A1 * | 1/2010 | Sznaider | G08B 21/10 |
| | | | 340/539.28 |
| 2013/0271286 A1 * | 10/2013 | Quan | G08B 5/00 |
| | | | 340/691.6 |
| 2015/0105918 A1 * | 4/2015 | Lee | F24D 19/1084 |
| | | | 700/276 |
| 2015/0112494 A1 * | 4/2015 | Woytowitz | A01G 25/167 |
| | | | 700/284 |
| 2015/0316918 A1 * | 11/2015 | Schleiss | G05B 15/02 |
| | | | 700/83 |
| 2016/0132046 A1 * | 5/2016 | Beoughter | G05B 19/4184 |
| | | | 700/17 |
| 2017/0273259 A1 * | 9/2017 | Eng | G05B 15/02 |
| 2019/0293371 A1 * | 9/2019 | Rollins | F04D 25/06 |

* cited by examiner

*Primary Examiner* — Vincent H Tran
(74) *Attorney, Agent, or Firm* — Marshall, Gerstein & Borun LLP

(57) ABSTRACT

Systems and methods for streaming non-process event data to computing devices include identifying non-process event data values based on non-process events. A non-process event may refer to an event associated with the process plant but not caused or generated within the process plant. The systems and methods further include generating one or more alarms or alerts corresponding to the non-process event data values. The systems and methods further include displaying the one or more alarms or alerts or the corresponding non-process event data values at an operator device in accordance with a display object governing a manner in which the one or more alarms or alerts or the corresponding non-process event data values are to be displayed on an operator interface.

23 Claims, 15 Drawing Sheets

300

302

| NON-PROCESS EVENT DATA SOURCE: | WEATHER SURVEILLANCE RADAR (DEVICE ID) | 308 |
| DATA TYPE: | WEATHER | 310 |

LOCATION CONDITIONS: MILES WITHIN PLANT 312
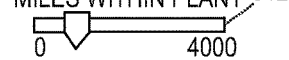
0    4000

SEVERITY CONDITIONS: CATEGORY SCALE 314
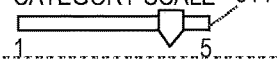
1    5

304

| NON-PROCESS EVENT DATA SOURCE: | WEBSITE (URL) ▽ | 316 |
| DATA TYPE: | NEWS | 318 |

KEYWORDS: "POLITICAL PROTEST", "RIOT", "LARGE CROWD" 320

LOCATION CONDITIONS: MILES WITHIN PLANT 322
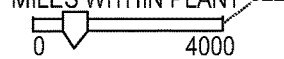
0    4000

SEVERITY CONDITIONS: CROWD DENSITY 324
1    5

306

| NON-PROCESS EVENT DATA SOURCE: | SURVEILLANCE SYSTEM (SYSTEM ID) | 326 |
| DATA TYPE: | SECURITY | 328 |

LOCATION CONDITIONS: 330
- ☐ SELECT ALL
  - ☐ AREA 1
    - ☒ CELL 1
    - ☐ CELL 2
  - ☐ AREA 2

SEVERITY CONDITIONS: 332
- ☐ SELECT ALL
  - ☐ INTRUDER
  - ☒ SPILLS
  - ☐ FIRE

*FIG. 3*

METHODS AND SYSTEMS FOR STREAMING NON-PROCESS EVENT DATA TO COMPUTING DEVICES

TECHNICAL FIELD

The present disclosure generally relates to monitoring of process control environments and, in particular, to a system for providing customizable, real-time awareness of a non-process event as it pertains to process control systems to a plurality of computing devices.

BACKGROUND

Distributed control systems (DCS) are used in a variety of process industries including chemical, petrochemical, refining, pharmaceutical, food and beverage, power, cement, water and wastewater, oil and gas, pulp and paper, and steel, and are used to control batch, fed-batch, and continuous processes operating at a single site or at remote locations. Process plants typically include one or more process controllers communicatively coupled to one or more computing devices (e.g., field devices, operator workstations) via analog, digital or combined analog/digital buses, or via a wireless communication link or network. Collectively, the various devices perform monitoring, control, and data collection functions to control the process, safety shutdown systems, fire and gas detection systems, machine health monitoring systems, maintenance systems, decision support, and other systems.

Field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration engineer to create or change operator interfaces which are used by a viewing application to display data to an operator and to enable the operator to change settings, such as setpoints, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

For a variety of reasons, access to data of a process event (e.g., status of a field device) occurring at the process control system has traditionally been available while on the process plant premises and/or while using a device connected to the data highway that couples the operator workstations, controllers, data historians, and other equipment. However, access to data of a non-process event (e.g., severe weather) affecting a process control system, and solutions thereof that take actionable steps upon receiving data of a non-process event, have largely been unaddressed.

Notifying plant personnel of non-process events is a particular safety concern with respect to process control systems. For example, notifying users, such as engineers and technicians, to evacuate a plant in response to dangers resulting from non-process events of a process plant has traditionally been handled by manually contacting such users, such as via their mobile devices or via email. Sometimes, notifying plant personnel may be cascaded in order of seniority (i.e., a site-wide operator may make a phone call to a regional operator assigned to a portion of the plant, who may contact other users under his supervision), which may delay propagation of evacuation information to some users. Controlling field devices (e.g., shutting down field devices) in response to non-process events may also provide benefits to the process control systems. There is currently no organized manner of detecting non-process event in real-time within the process plant or within some proximity of the process plant, such as detecting severe weather in real time, much less an easily implementable system for detecting non-process events and alerting personnel of the non-process events on a system-level basis.

SUMMARY

The systems and methods described herein relate to recognition of several types of non-process events that are detected by analyzing data from different, possibly diversely located devices (e.g., non-process event data source, external interface server, controller) within the process plant. Operator devices (e.g., operator workstations) are configured to present such non-process event data to operators or other personnel via an operator interface. As such, the systems and methods herein describe an organized manner of detecting non-process events in real-time within the process plant (e.g., chemical spills inside the process plant) or within a predetermined proximity of the process plant (e.g., severe weather approaching the process plant), and alerting personnel of the detected non-process events on a system-level basis.

Accordingly, some aspects of the systems and methods as described herein relate to detection of a non-process event, and secure and timely communication of a non-process event datastream that identifies or characterizes the non-process event. The non-process event datastream may be provided from a non-process event data source to computing devices via a process control system of a process plant. The systems and methods may allow secure access to any non-process event data values obtained by the process control system in real-time via an external interface server receiving the non-process event datastream from the non-process event data source. The external interface server may obtain the non-process event datastream in real-time, generate corresponding non-process event data values, and provide the non-process event data values to a controller of the process control system. The controller may generate alarms or alerts corresponding to the non-process event data values, and provide the alarms or alerts to computing devices, such as operator devices, for display. Accordingly, the process control system may automatically detect non-process events and display alarms or alerts corresponding to the non-process events on an operator interface of the operator device.

In an embodiment, the disclosed operator interface enables an operator to perform one or more of the following: manage alarms or alerts corresponding to detected non-process events, adjust the process of detecting non-process events by entering new setpoints, responding to alarms or alerts by notifying other operator devices of the detected non-process events, and "zooming in" or "zooming out" on particular portions of a visual map displayed on the operator interface for further details about the detected non-process events, among other advantages and features.

Other features and advantages will be apparent to those skilled in the art from the following detailed description with reference to the accompanying drawings and appended claims.

BRIEF DESCRIPTION OF THE DRAWINGS

The features and advantages of the methods, apparatus, and systems described herein will be best appreciated upon reference to the following detailed description and the accompanying drawings, in which:

FIG. 3 is a graphical interface that may be displayed at the external interface server within the example process control environment;

DETAILED DESCRIPTION

Figure 1:
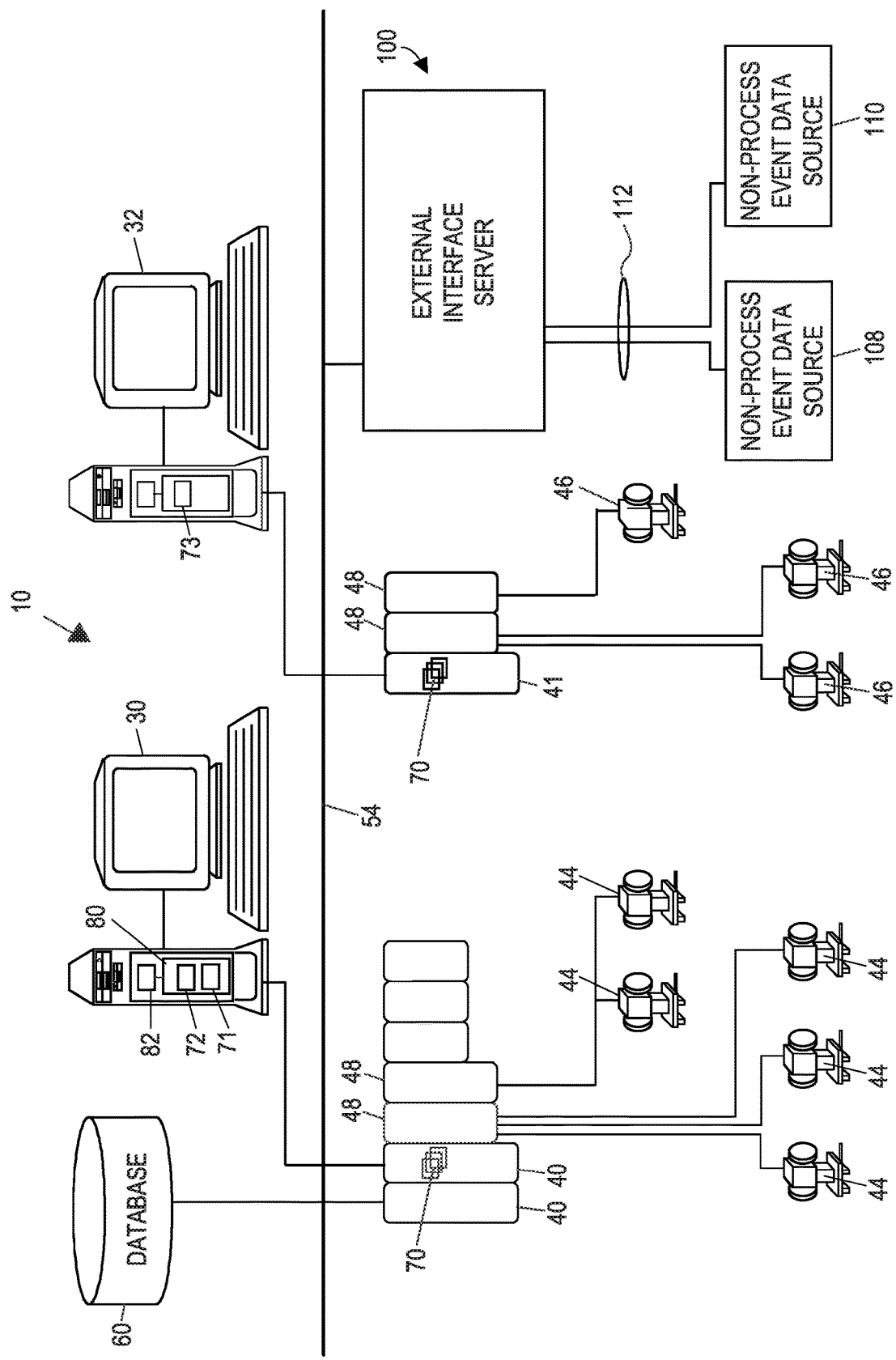
FIG. 1 is a block diagram of an example process control environment according to the present description.

As described above, known distributed process control systems lack the ability of automatically alerting plant personnel and others associated with a process control system of a process plant in response to a non-process event. A non-process event, as described herein, refers to an event associated with the process plant but not traditionally detectable by conventional process modules configured within the process control system. Non-limiting examples of types of non-process events may include weather (e.g., severe thunderstorm), news (e.g., crime in the area), geological activity (e.g., earthquakes), political activity (e.g., political protest or speech), hazardous activity within the plant (e.g., spills, leaks, odors, radiation, or contamination from chemicals or other hazardous materials), or even terror activity that is detected near or inside the premise of the process plant. The non-process event may affect the safety or security of plant personnel or the process plant itself. Other examples of non-process events that are not caused or generated within the process control system, in contrast to process events that are caused or generated within the process control system (e.g., opening of a valve), are contemplated. Examples of a process event include detected outages within the process plant, or a breakdown in one or more field devices.

With respect to non-process events, existing technologies at a process plant simply do not track or detect non-process events. Accordingly, conventional distributed process control systems are constrained to generating alerts upon detection of a process event, but do not extend to generating alarms or alerts upon detection of a non-process event, and selectively transmitting the alarms or alert to particular computing device (e.g., operator device assigned to monitor a portion of the plant), field devices, or other devices connected within the process plant that may specifically be affected by a non-process event. As a result, existing technologies in a process plant are unable to automatically alert or take precautionary measures in response to non-process events. Further, existing technologies concerning contacting plant personnel in response to non-process events include manual methods of communication, such as by individually calling plant personnel and others associated with a process control system, to warn them of non-process events.

Therefore, an absence of an automated non-process event detection and alarm or alert notification system integrated in the operation and management of the process plant can have deleterious effects on product quality, plant efficiency, maintenance, environmental safety, personnel safety, regulatory compliance, and other aspects of process plant management. Implementations of the systems, devices, and methods for alarm or alert distribution described herein can mitigate many of the disadvantages of conventional distributed process control systems, and the issues associated therewith, provide increased situational awareness for plant personnel, and result in additional advantages that will become apparent throughout the following disclosure.

FIG. 1 illustrates an example process control system 10 of a process plant in which alarms or alerts corresponding to various types of non-process events are provided to one or more operator devices and/or various functional areas of the plant. As is typical, the process plant includes a distributed process control system having one or more controllers 40, 41, each connected to one or more field devices 44, 46 via input/output (I/O) devices or cards 48 which may be, for example, Fieldbus interfaces, Profibus interfaces, HART interfaces, standard 4-20 mA interfaces, etc. The controllers 40, 41 are also coupled to one or more host or operator devices 30, 32, respectively, via a data highway 54 which may be, for example, an Ethernet link, or one or more networks.

A database 60 may be connected to the data highway 54 and operates as a data historian to collect and store parameter, status and other data associated with the controllers 40, 41 and field devices 44, 46 within the plant and/or as a configuration database that stores the current configuration of the process control system 10 within the plant as downloaded to and stored within the controllers 40, 41 and field devices 44, 46. The database 60 may additionally store display objects created in the manner described herein to provide graphical support within the process plant. While the controllers 40, 41, I/O cards 48, and field devices 44, 46 are typically located down within and distributed throughout the sometimes harsh plant environment, the operator devices 30, 32 and the database 60 are usually located in control rooms or other less harsh environments easily assessable by controller or maintenance personnel. However, one of ordinary skill in the art will understand that the controllers 40, 41, I/O cards 48, and field devices 44, 46 may be located in less harsh environments. Likewise, the operator devices may also be located in and throughout the plant environment, such as when the operator devices are mobile devices.

As is known, each of the controllers 40, 41, which may be by way of example, the DeltaV™ controller sold by Emerson Process Management, stores and executes a controller application that implements a control strategy using any number of different, independently executed, control modules 70. Each of the control modules 70 can be made up of what are commonly referred to as function blocks wherein each function block is a part or a subroutine of an overall control routine and operates in conjunction with other function blocks (via communications called links) to implement process control loops within the process plant.

As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant. Of course hybrid and other types of complex function blocks exist such as model predictive controllers (MPCs), optimizers, etc. While the Fieldbus protocol and the DeltaV™ system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique.

In the plant illustrated in FIG. 1, the field devices 44, 46 connected to the controllers 40, 41 may be standard 4-20 mA devices, may be smart field devices, such as HART, Profibus, or FOUNDATION™ Fieldbus field devices, which include a processor and a memory, or may be any other desired type of devices. Some of these devices, such as Fieldbus field devices, may store and execute modules, or sub-modules, such as function blocks, associated with the control strategy implemented in the controllers 40, 41. Function blocks disposed in Fieldbus field devices may be executed in conjunction with the execution of the control modules 70 within the controllers 40, 41 to implement process control, as is well known. Of course, the field devices 44, 46 may be any types of devices, such as sensors, valves, transmitters, positioners, etc., and the I/O devices 48 may be any types of I/O devices conforming to any desired communication or controller protocol such as HART, Fieldbus, Profibus, etc.

In the process plant of FIG. 1, the operator devices 30, 32 may include various applications that are used for various different functions performed by the same or different personnel within the plant. Each of the operator devices 30, 32 includes a memory 80 that stores various applications, programs, data structures, etc. and a processor 82 which may be used to execute any of the applications stored in the memory 80. In the example illustrated in FIG. 1, the operator device 30 may be a configuration workstation and include a suite of applications 71 that may include, for example, configuration applications such as control module creation applications, operator interface creation applications, and other data structures which can be accessed by any authorized configuration engineer to create and download control routines or modules, such as the control modules 70, to the various controllers 40, 41 and field devices 44, 46 of the plant. Of course, another operator device (e.g., operator device 32) may be designated as the configuration workstation.

The operator device 30 illustrated in FIG. 1 may be a site-wide control operator viewing workstation and include, among the suite of applications 71, a number of display applications that may provide a control operator with various displays during operation of the process plant to enable the operator to view and control what is happening within the process plant or in various sections of the plant. The display applications may further include support applications such as control diagnostic applications, tuning applications, report generation applications or any other control support applications that may be used to assist a site-wide control operator in performing control functions.

Whereas the operator device 30 may be capable of viewing operation of the entire plant, the operator device 32 may be assigned to a particular portion of the plant, and therefore capable of viewing operation of the assigned portion of the plant. For example, the operator device 32 may be a maintenance viewing workstation for particular field devices 46, and include a number of maintenance applications that may be used by various maintenance personnel to view the maintenance needs or operation of the particular portion of the plant, to view the operating or working condition of various field devices 46, etc. Of course, the applications 71 may include support applications such as maintenance diagnostic applications, calibration applications, vibration analysis applications, report generation applications or any other support applications that may be used to assist an operator of the operator device 32 in performing functions within the particular portion of the plant.

As is typical, each of the workstations 30, 32 includes a display screen configured to display an operator interface, along with other standard peripheral devices, like a keyboard, a mouse, etc. as tools to provide inputs into the operator interface.

In the plant illustrated in FIG. 1, an external interface server 100 communicatively coupled to the data highway 54 may be configured to receive datastreams corresponding to non-process events detected by non-process event data sources 108, 110. The external interface server 100 generally operates to determine, identify, collect, and/or store non-process event data values contained within the datastreams from non-process event data sources 108, 110 via communication links 112. The non-process event data sources 108, 110 may be equipped with source tags. As such, the external interface server 100 may be specified with the same source tags to receive datastreams and identify non-process event data values from only those non-process event data sources 108, 110 equipped with the source tags. As will be described herein, the non-process event data values may be location values, severity values, and time values related to weather events (e.g., precipitation, temperature, location of a hurricane, estimated time the hurricane will approach a certain location), geological events (e.g., seismic activity), political events (e.g., noise level, crowd level, time of a scheduled political rally), local news events (e.g., crime activity, time when a criminal on the loose was last seen), safety events (e.g., location of a chemical spill, severity of a fire, time of a gas leak), security events (e.g., location of an intruder) or any suitable non-process event. Upon determining, collecting, and/or storing non-process event data values, the external interface server 100 may provide the non-process event data values to controller 40, database 60, or other downstream entities within the process control system 10.

The external interface server 100 may interface with various kinds of non-process event data sources 108, 110, which may detect, or otherwise supply data related to the non-process event. Non-limiting examples of a non-process event data source 108 include a weather data source, news data source, a geological activity data source, and a political data source, where each source may be a website, for example. Other examples of the types of sources will be described herein. The non-process event data source 108 may also be a data aggregator, such as a social media feed or an online service configured to receive the non-process event datastream from at least one of the news data source, the weather data source, the political data source, or the geological activity data source. Non-limiting examples of data aggregators include AllisonHouse™, Twitter®, Global Incident Map, and Stratfor Worldview™. Accordingly, such sources may be hosted on devices that are external to the process control system 10, and may provide non-process event datastreams (e.g., weather datastreams, news datastreams, geological activity datastreams, political datastreams, aggregated datastreams) to the external interface server 100. In contrast, non-process event data sources 110, such as a safety data source or a security data source, may be hosted on a device within the process control system 10, such as a surveillance system or console, which may provide datastreams (e.g., safety datastreams or security datastreams) to the external interface server 100 for the external interface server 100 to identify location values, severity values, and time values related to safety events (e.g., time of an observed gas leak) or security events (e.g., location of an intruder, threat severity of the intruder).

The non-process event datastream(s) provided by the non-process event data sources 108, 110 may be assessed by the process control system 10 to determine whether the non-process event corresponding to the non-process event datastream(s) warrants alerting an operator at an operator device 30, 32. For example, the process control system 10 may use location values, severity values, and/or time values associated with the non-process event collected by the non-process event data source 108, 110 to make such a determination. The location value may include scalar or vector information describing a direction and/or location corresponding to a non-process event with or without respect to the location of the process plant. The severity value may include metric information describing a severity corresponding to a non-process event with or without respect to the location of the process plant. The time value may include temporal information describing a time in which a non-process event is expected to occur, occurring, or already occurred with or without respect to the location of the process plant.

Accordingly, not all non-process events may warrant alerting the operator device 30. For example, a forest fire having a location value of "California" may not warrant alerting the operator device 30 associated with a process plant located in Florida. As another example, a hurricane having a severity value of "category 5 hurricane" located in Miami, Fla., may warrant alerting the operator device 30 associated with a process plant located in Tampa, Fla. Some non-process events may always warrant alerting the operator device 30. For example, a location value, severity value, and/or time value of the non-process event detected by the safety data source or security data source may warrant alerting the operator device 30 associated with the process plant regardless of the location value, severity value, and/or time value.

In any event, the external interface server 100 may effectively represent detected non-process events as non-process event data values for manipulating or processing by the controller 40, database 60, or other downstream entities within the process control system 10.

Figure 2:
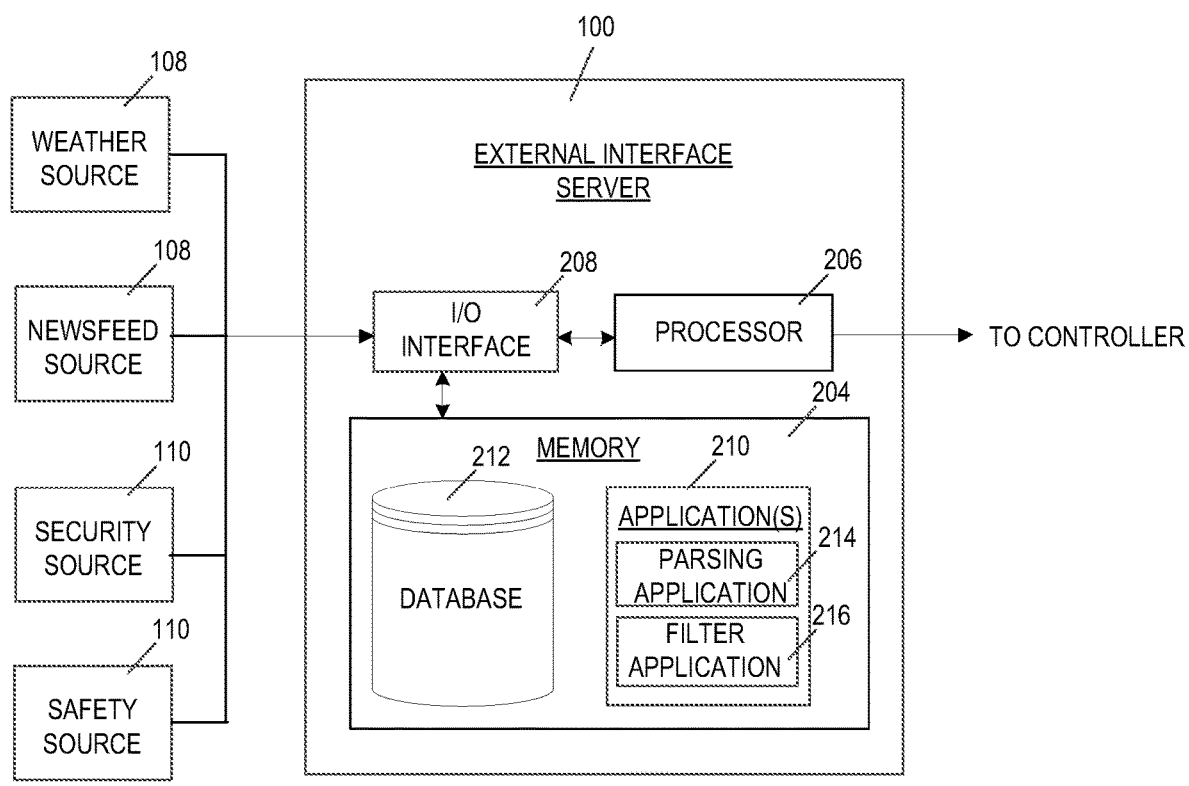
FIG. 2 is a block diagram of an example external interface server within the example process control environment.

Turning now to FIG. 2, a block diagram of the external interface server 100 is provided. Structurally, the external interface server may include memory 204, a processor 206, and an I/O interface 208. The I/O interface 208 may receive datastreams from a non-process event data source 108 (e.g., a weather data source, a news data source) and/or non-process event data source 110 (e.g., a security data source, a safety data source).

The processor 206 may be communicatively coupled to the memory 204, and configured to execute one or more applications 210 stored in the memory 204 in order to process the datastreams and store the processed datastreams (i.e., non-process event data values) into a database 212. The database 212 may be within the external interface server 100 as illustrated in FIG. 2, or may be one of the databases external to the external interface server (e.g., database 60) as illustrated in FIG. 1. In some embodiments, the processor 206 may execute a parsing application or routine 214 that parses a datastream to identify particular non-process event data values, such as a precipitation value, temperature value, location value (e.g., from the weather data source 108), population density value, location value (e.g., from the news data source 108), or threat type value (e.g., from the safety data source 110 or security data source 110). Data values such as precipitation value, temperature value, population density value, and threat type value may generally be described herein as a "severity value," as the values may indicate the severity of a non-process event. As the name implies, a "location value" may indicate the location of a non-process event, and may be in the form of longitude and latitude coordinates or name of a place, for example. Other types of values are contemplated. For example, a time value may indicate the time that the non-process event is expected to occur, currently ongoing, or expected to end.

For example, if the datastream contains mark-ups (e.g., tags) that specifically designate data values and data types corresponding to the data values in addition to content descriptive of the non-process event, the parsing application 214 may exhibit a computer algorithm (e.g., a natural language algorithm, word parsing algorithm) configured to detect the mark-ups and identify the content immediately prior to or subsequent to the detected mark-ups. The computer algorithm may also use keyword detection and/or artificial intelligence techniques to categorize or translate the content into a location value data type, severity value data type, or a time value data type. A non-limiting example of a mark-up language is Extensible Markup Language (XML), which defines a set of rules for encoding a website in a format that is both human-readable and machine-readable. Several schema techniques exist to aid in the definition of XML-based languages, and many application programming interfaces (APIs) exist to aid the processing of XML data. Many formats using XML syntax has been developed, including RSS, Atom, SOAP, SVG, and XHTML. Such schema techniques and APIs may be incorporated into the computer algorithm so that the processor 206 is capable of parsing a datastream to identify particular non-process event data values.

As another example, if the datastream is a multimedia stream including video and/or image data, the parsing application 214 may exhibit a computer algorithm (e.g., a video or image processing algorithm) configured to detect particular non-process event data values, such as a precipitation value, temperature value, location value (e.g., from the weather data source 108), population density value, location value (e.g., from the news data source 108), or a threat type value (e.g., from the safety data source 110 or security data source 110), from the video and image data and/or metadata tied to the video and image data.

The processor 206 may then transmit the non-process event data values to a controller 40 communicatively coupled to the external interface server 100 via the highway 54 or one or more networks, for further processing by the controller 40, such as generating alarms or alerts based on the non-process event data values. The non-process event data values may be in a suitable format that is readable by the controller 40, particularly by one or more control modules of the controller 40. Accordingly, the parsing application 214 may include a computer-implemented routine that includes one or more instruction sets that cause the processor 206 to (1) receive a datastream associated with non-process events from a non-process event data source, (2) parse the datastream to identify non-process event data values, and (3) transmit the non-process event data values to a controller for the controller to generate alarms or alerts based on the non-process event data values.

In embodiments, the processor 206 may also execute a filter application or routine 216 that compares the non-process event data values identified by the parsing application 214 to programmable thresholds (i.e., setpoint values) and may store the particular non-process event data values that meet or exceed the threshold into the database 212. For example, the filter application 216 may exhibit a computer algorithm configured with programmable location thresholds, severity thresholds, and/or time thresholds for each type of non-process event to evaluate whether the location value, severity value, and/or time value corresponding to a non-process event identified by the external interface server 100 meets or exceeds the respective location threshold, severity threshold, and/or time threshold. The computer algorithm may also use various automated techniques, including artificial intelligence techniques, to automatically adjust the threshold levels based on historical trends or records. In this way, the database 212 may store non-process event data values corresponding to non-process events that are considered relevant (i.e., affect the safety or security of the plant) to the process control system 10 of a process plant, such as a hurricane 100 miles away, or a political protest within 1 mile from the plant. Accordingly, the database 212 may not store non-process event data values corresponding to non-process events that are less relevant or not relevant to the process control system 10 of a process plant, such as a hurricane 4000 miles away, for example, as such non-process events may not affect the safety or security of the plant.

The processor 206 may then transmit the non-process event data values that are stored in the database 212 to a controller 40 communicatively coupled to the external interface server 100 via the highway 54 or one or more networks, for further processing by the controller 40, such as generating alarms or alerts based on the non-process event data values. Accordingly, the filter application 216 may include a computer-implemented routine that includes one or more instruction sets that cause the processor 206 to (1) receive non-process event data values, (2) filter the non-process event data values to identify particular non-process event data values that meet or exceed a programmable threshold, and (3) transmit the non-process event data values that meet or exceed the programmable threshold to a controller for the controller to generate alarms or alerts based on the non-process event data values.

Although the embodiment in FIG. 2 only illustrates three non-process event data sources, one of ordinary skill in the art will understand that additional or less non-process event data sources described above may provide datastreams to the I/O interface 208. For data security reasons, the non-process event data sources 108 may be configured to be firewalled from the external interface server 100 and the process control system 10. For example, the communication between the non-process event data sources 108 and the external interface server 100 may be unidirectional, in that the event data sources 108 may only be able to provide non-process event datastreams to the external interface server 100, but may not be able to retrieve any information from the external interface server 100.

FIG. 3 illustrates examples of a graphical interface 300 corresponding to parsing application 214 and filter application 216. A user that maintains the external interface server 100 may utilize the graphical interface 300 to assist in linking the non-process event data sources 108, 110 with the external interface server 100, as well as configuring the types of data to be received at the external interface server 100. Each of the non-process event data sources 108, 110 may be assigned a unique tag. The unique tag provides an easy way to reference the corresponding non-process event data sources 108, 110. The tags may be used during the configuration of the external interface server 100 to specify the non-process event data sources 108, 110. Each datastream provided by the non-process event data sources 108, 110 has associated with it a particular format or set of information, and the tag for a particular source may have associated with it a specific datastream type such that when the tag is associated with the external interface server 100, the external interface server 100 understands the format and information associated with the datastream.

Generally, the graphical interface 300 corresponding to the parsing application 214 may include fields where a user may input identification information (e.g., tag) for the non-process event data sources 108, 110 so that the external interface server 100 may recognize the non-process event data sources 108, 110. The graphical interface 300 may also include fields where a user may input a data value type for the non-process event data sources 108, 110 in order to calibrate the information received from the non-process event data sources 108, 110 as that data value type. Similarly, the graphical interface 300 corresponding to the filter application 216 may include fields where a user may input conditions or criteria, such as location conditions and severity conditions, so that the external interface server 100 may identify non-process event data values that have the designated data value type and meets the conditions or criteria.

By way of example, to link the weather data source 108 of FIG. 2 with the external interface server 100, the graphical interface 302 corresponding to the parsing application 214 may include field 308 (e.g., a text box) where a user may input identification information (e.g., a device identifier, serial number, model number, etc.) to identify the particular weather data source 108 (e.g., weather surveillance radar) so that the external interface server 100 may recognize the weather data source 108. The graphical interface 302 may also include field 310 (e.g., drop down menu) where a user may input a data value type (e.g., weather) for the weather data source 108 in order to calibrate the information received from the weather data source 108 as that data value type. Similarly, the graphical interface 302 corresponding to the filter application 216 may include slidable scales 312, 314 where a user may input conditions or criteria so that the external interface server 100 may identify non-process event data values that have the weather data value type and meets the conditions or criteria. The user may control slidable scales 312 and 314 to receive data concerning a weather event (e.g., a hurricane) that is within a particular distance from the plant having a severity that is within a certain metric (e.g., category of the hurricane).

As another example, to link the news data source 108 of FIG. 2 with the external interface server 100, the graphical interface 304 corresponding to the parsing application 214 may include field 316 (e.g., a dropdown menu) where a user may input identification information (e.g., a URL) to identify the particular news data source 108 (e.g., a newsfeed website) so that the external interface server 100 may recognize the news data source 108. The graphical interface 302 may also include field 318 (e.g., text box) where a user may input a data value type (e.g., news) for the news data source 108 in order to calibrate the information received from the news data source 108 as that data value type. Similarly, the graphical interface 304 corresponding to the filter application 216 may include keywords fields 320 where a user may input particular keywords to filter the news data received by the external interface server 100. The user may enter keywords such as "political protest," "riot," or "large crowd" for the external interface server 100 to identify non-process event data values that have the news data value type concerning a large body of people that may affect the safety or ability for personnel to enter or leave the plant. The graphical interface 304 may also include slidable scales 322, 324 to further filter the received news data values so that the external interface server 100 may identify news data values concerning a news event (e.g., a protest, riot, large crowd) that is within a particular distance from the plant having a severity that is within a certain metric (e.g., crowd density).

As another example, to link the safety data source 110 or security data source 110 of FIG. 2 with the external interface server 100, the graphical interface 306 corresponding to the parsing application 214 may include field 326 (e.g., a text box) where a user may input identification information (e.g., a system identifier, serial number, model number, etc.) to identify the particular safety data source 110 (e.g., a sensor configured to detect leaks, gas, fire) or security data source 110 (e.g., surveillance system at a security checkpoint) so that the external interface server 100 may recognize the safety data source 110 or security data source 110. The graphical interface 306 may also include field 328 (e.g., text box) where a user may input a data value type (e.g., safety, security) for the safety data source 110 or security data source 110 in order to calibrate the information received from the safety data source 110 or security data source 110 as that data value type. Similarly, the graphical interface 306 corresponding to the filter application 216 may include checkbox fields 330, 332 where a user may input conditions or criteria so that the external interface server 100 may identify safety data values or security data values concerning a safety event or security event that meets the conditions or criteria. The user may select particular options in the checkbox fields 330, 332 to receive data concerning a safety event (e.g., spills) or security event (e.g., intruder) that is within a particular area of the plant (e.g., cell 1).

Although the examples in FIG. 3 only illustrate three graphical interface, one of ordinary skill in the art will understand that additional or less graphical interfaces having different arrangements and types of data fields than the ones described above may be contemplated. One of ordinary skill in the art will also understand that the graphical interfaces may also include fields for a user to input time conditions to identify data values for a non-process event expected to occur, occurring, or already occurred.

Figure 4:
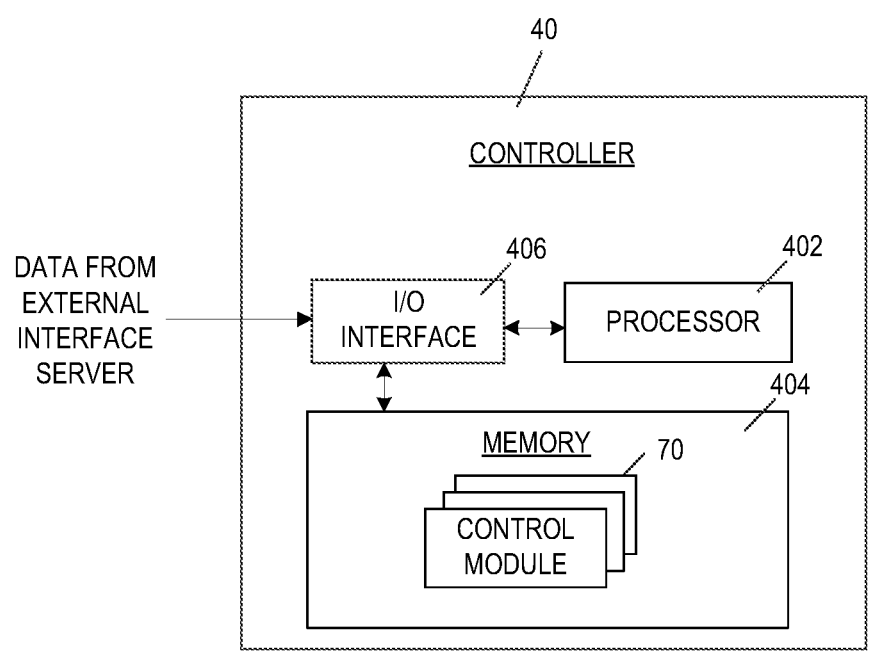
FIG. 4 is a block diagram of an example controller within the example process control environment.

Turning now to FIG. 4, a block diagram of the controller 40 is provided. The controller 40 may be configured to receive the non-process event data values from processor 206 and generate alarms or alerts based on the non-process event data values. Of course, the controller 40 may also generate alarms or alerts based on various parameters, variables, and process event data values, according to process modules, in order to detect process outages within the process plant, or a breakdown in one or more field devices 44, 46, for example. Structurally, the controller 40 may include a processor 402, memory 404, and an I/O interface 406. The I/O interface 406 may receive the filtered (and therefore considered to be relevant) non-process event data values from the external interface server 100. The processor 402 may be communicatively coupled to the memory 404, and configured to execute a controller application that executes one or more control modules 70 downloaded to the controller 40 and stored in the memory 404, in order to process the relevant non-process event data values.

Figure 5:
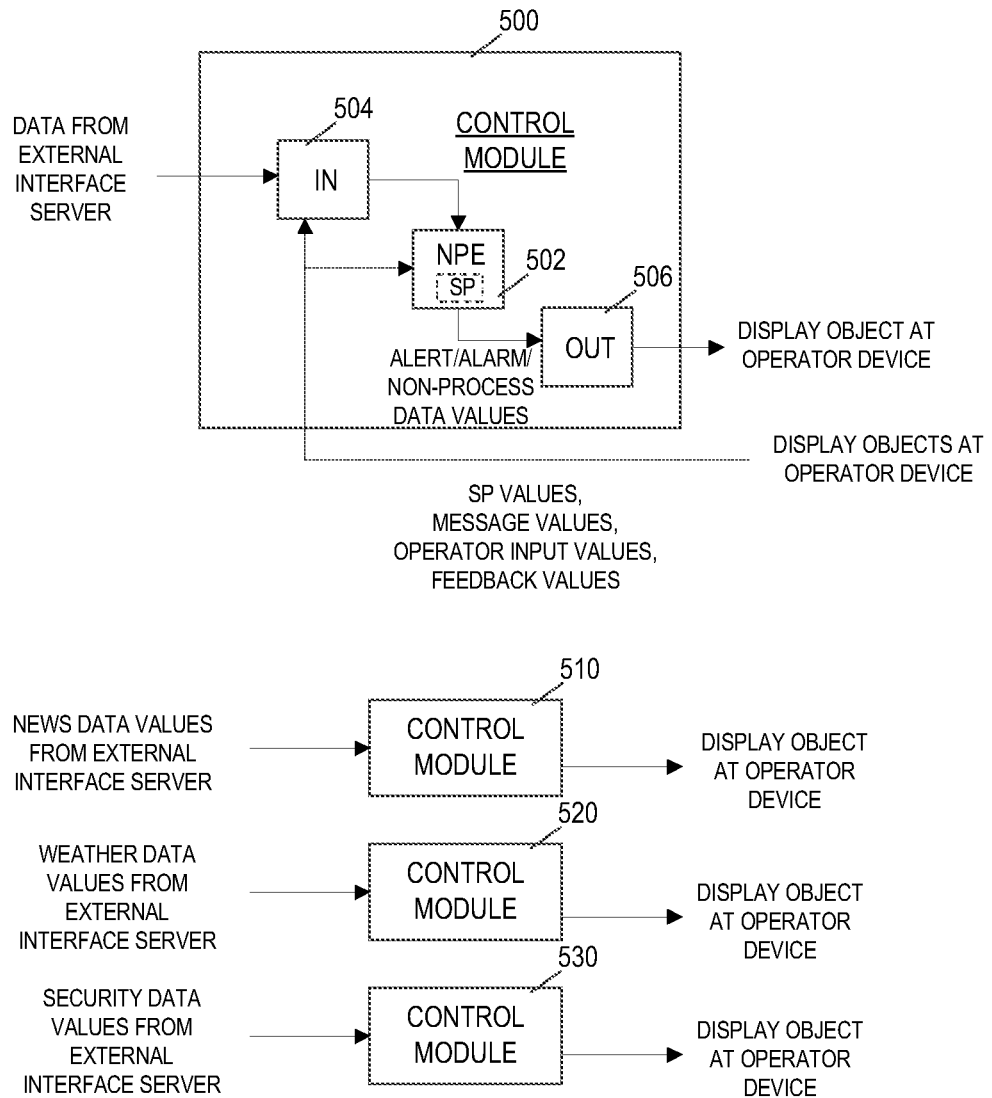
FIG. 5 is a block diagram of example control module(s) executable by the example controller within the example process control environment.
Figure 6:
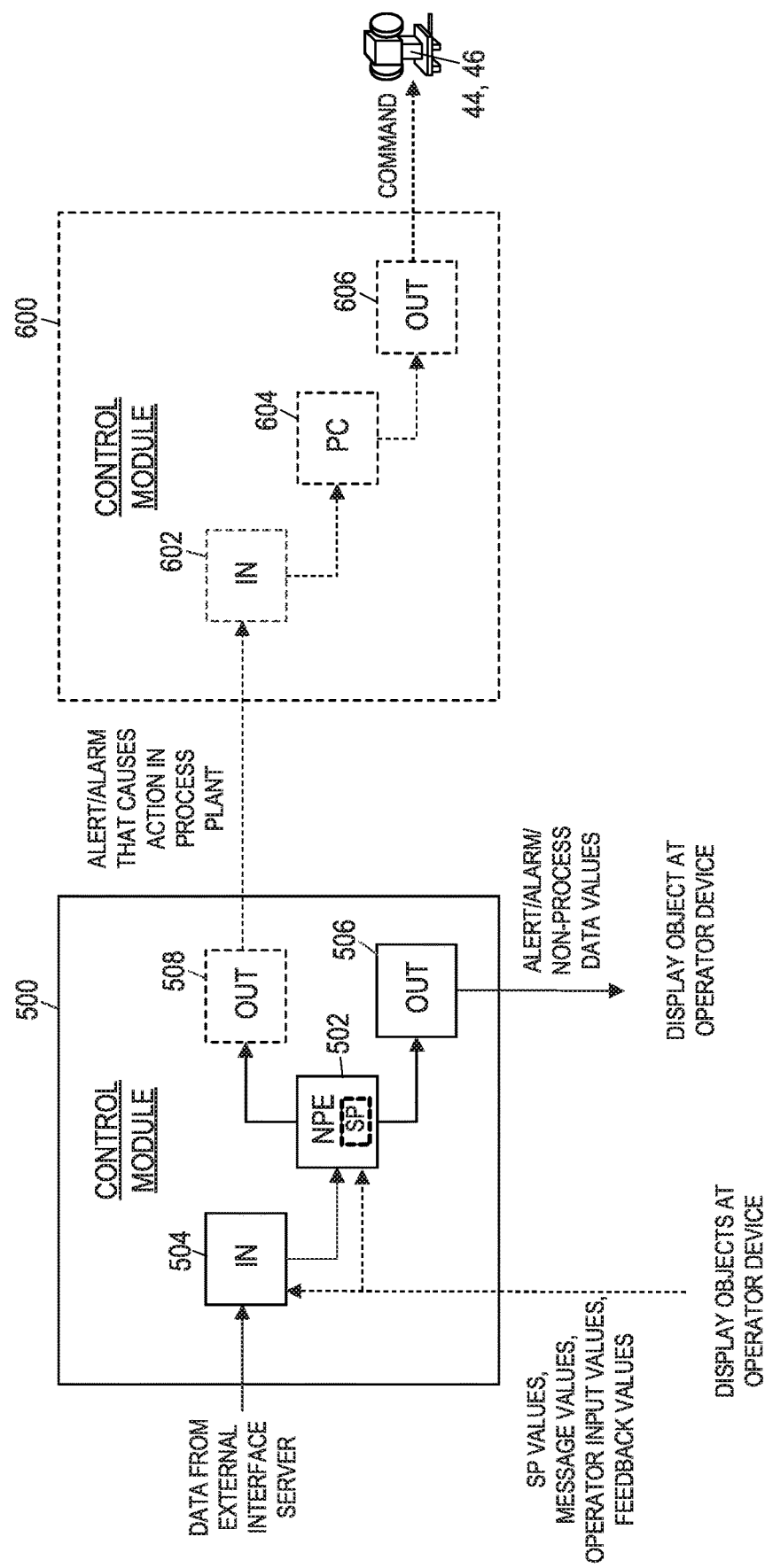
FIG. 6 is a block diagram of example control module(s) executable by the example controller within the example process control environment.

Generally, a control module 70 may, alone, or in combination with other control modules 70, generate an alarm or alert corresponding to a non-process event and send the alarm or alert over data highway 54 to at least the operator device 30 so that an alarm or alert corresponding to a non-process event (e.g., the relevant non-process event data values) may appear at an operator screen of the operator device 30. In some embodiments, the control module 70 may, alone, or in combination with other control modules 70, generate an alarm or alert corresponding to a non-process event and subsequently generate, based on the alarm or alert, a command signal for controlling field devices 44, 46. In this way, in response to an alarm or alert indicative of a political protest near the plant requiring the plant to shut down, the one or more control modules 70 may generate a command signal to shut down field devices 44, 46, for example. FIGS. 5 and 6 illustrate example embodiments of the configuration of one or more control modules 70. As will be known to one of ordinary skill in the art, the one or more control modules 70 may be arranged or interconnected in any number of ways to carry out a desired function.

FIG. 5 illustrates examples of the control module 70, such as a single control module 500 having at least one main processing function block, including a non-process event (NPE) function block 502. The NPE function block 502 may be configured to receive non-process event data values from the external interface server 100, process the non-process event data values to generate an alarm or alert, and send the alarm or alert to at least the operator device 30. In embodiments where the non-process event data values have already been filtered by the filter application 216, the NPE function block 502 may simply generate the alarm or alert based on the filtered non-process event data values. In other embodiments where the non-process event data values have not been filtered at the external interface server 100, the NPE function block 502 may essentially perform processing techniques similar to those performed by the filter application 216, such as comparing the non-process event data values to predetermined criteria or thresholds (i.e., setpoint values) to determine whether to generate an alarm or alert for the non-process event data values. In one example, the NPE function block 502 may function as a comparator that compares a setpoint value (e.g., a threshold location value, a threshold severity value, a threshold time value) with the actual non-process event data value (e.g., actual location value, actual severity value, actual time value) received from the external interface server 100, so that the controller 40 may only pass through the actual non-process event data values that meet or exceed the setpoint value onto a downstream process. The NPE function block 502 may be programmed with the setpoint value initially by a configuration engineer using a configuration application to create the NPE function block 502.

Still, in other embodiments where the non-process event data values have already been filtered by the filter application 216, the NPE function block 502 may be configured to further narrow down the non-process event data values into a smaller subset of non-process event data values based on the setpoint values to generate an alarm or alert for the smaller subset of non-process event data values.

In other embodiments, the control module 500 may also include an input function block 504 (e.g., to reformat non-process event data values into a suitable format usable by the NPE function block 502) and an output function block 506 (e.g., to reformat the generated alarm or alert, location values, severity values, and/or time values into a suitable format usable by the operator device 30). Because the single control module 500 may receive non-process event data values corresponding to various types of non-process events, the non-process event (NPE) function block 502 may also be configured to sort the non-process event data values based on the respective type of non-process events to generate respective alarms or alerts.

In another embodiment, a plurality of control modules 510, 520, and 530 may each have at least one main processing function block, such as the non-process event (NPE) function block 502. Each NPE function block may be dedicated to receiving non-process event data values corresponding to a particular type of non-process event, processing the non-process event data values to generate an alarm or alert for the particular type of non-process event, and sending the alarm or alert to at least the operator device 30. For example, control module 510 may receive news data values corresponding to a relevant news event (e.g., and not receive weather data values) to generate an alarm or alert for the relevant news event. Similarly, control module 520 may receive weather data values corresponding to a relevant weather event (e.g., and not receive news data values) to generate an alarm or alert for the relevant weather event. Because the plurality of dedicated control modules 510, 520, and 530 may receive non-process event data values corresponding to particular types of non-process events, the non-process event (NPE) function blocks 502 of the plurality of dedicated control modules 510, 520, and 530 need not be equipped with sorting functionality that may otherwise be present in the non-process event (NPE) function block 502 of the single control module 500.

In another embodiment, as shown in FIG. 6, control module 600 may be configured to control a process action (e.g., shutting down field devices 44, 46, changing a set point value that affects operation of the field devices 44, 46) based on the generated alarm or alert corresponding to a non-process event. The control module 600 may additionally be configured to control a process action (e.g., shutting down field devices 44, 46) based on alarms or alerts corresponding to a process event, as is known. Therefore, and advantageously, the control module 600 described herein may be configured to not only receive and respond to alarms or alerts corresponding to process events, but may also receive and respond to alarms or alerts corresponding to non-process events. As shown in FIG. 6, control module 600 may have at least one main processing function block, such as a process control (PC) function block 604. The PC function block 604 may be configured to receive the generated alarm or alert corresponding to a non-process event from the control module 500, generate a command control signal in response to the alarm or alert corresponding to the non-process event, and send the command control signal to at least the field devices 44, 46. Of course, in other embodiments, there may be an input function block 602 (e.g., to reformat the generated alarm or alert into a suitable format usable by the PC function block 604) and an output function block 606 (e.g., to reformat the generated command control signal into a suitable format usable by the field devices 44, 46). As shown in FIG. 6, the input function block 602 may receive the alarm or alert from a dedicated output function block 508. In other embodiments, the input function block 602 may receive the alarm or alert from the output function block 506 or even the NPE function block 502.

It should also be noted that the control modules 70 (and hence, the function blocks) may be stored in the database 60. When configured, the controller 40 may download and execute the control modules 70. As will be described further herein with respect to FIG. 7, the alarm or alert corresponding to a non-process event generated by the various control modules 70 illustrated in FIGS. 5 and 6 is tied to one or more display objects. In other words, the alarm or alert may be usable by the one or more display objects. Particularly, control modules 70 in the controllers 40 may send alarms or alerts over the communication lines or links (e.g., data highway 54, one or more networks) to display objects 72, 73, such that upon instantiation of the one or more display objects at the operator devices 30, 32, an operator may view the alarm or alert as it pertains to the plant on an operator interface. As such, in embodiments described herein, one or more display objects may receive alarms or alerts corresponding to non-process event data values.

In some embodiments, all display objects may be configured to automatically receive alarms or alerts corresponding to non-process event data values for a particular type of non-process event. For example, a particular type of safety event, such as a fire detected at the plant, may warrant all operators devices to display alarms or alerts corresponding to the fire, and therefore, all display objects may be configured to automatically receive alarms or alerts corresponding to the type of non-process event (e.g., a fire), such that upon instantiation of each display object at each operator device, all operators may view the alarm or alert as it pertains to the fire.

However, in other embodiments, it may not be necessary for all display objects configured to automatically receive alarms or alerts corresponding to non-process event data values for a particular type of non-process event. For example, a particular type of news event, such as a political protest detected near a north end of the plant yet far away from a south end of the plant, may warrant an operator device assigned to monitor the north end of the plant to display alarms or alerts corresponding to the protest, but may not warrant another operator device assigned to monitor the south end of the plant to display alarms or alerts corresponding to the political protest. Therefore, only the display object instantiated at the operator device assigned to monitor the north end of the plant may need to be configured to automatically receive alarms or alerts corresponding to the protest.

Accordingly, the type of non-process event corresponding to the alarm or alert may determine which display objects (i.e., particular display object(s) or even all display objects) receive the alarm or alert. In some embodiments, for particular display object(s) to receive an alarm or alert corresponding to all types of non-process events from a designated controller (e.g., controller 40), the control module 70 or a function block within the control module 70 (e.g., NPE function block 502) of controller 40 may be configured to receive non-process event data values for all data value types (e.g., weather, news, geological, political, safety, security) from the external interface server 100 to subsequently generate an alarm or alert corresponding to the non-process event data values for all data value types.

In other embodiments, for particular display object(s) to receive an alarm or alert corresponding to particular types of non-process events from a designated controller (e.g., controller 40), the control module 70 or a function block within the control module 70 (e.g., NPE function block 502) of controller 40 may be configured to receive non-process event data values for particular data value types from the external interface server 100 to subsequently generate an alarm or alert corresponding to the non-process event data values only for the particular data value types. For example, if the control module 70 of controller 40 is configured to receive only particular non-process event data values, such as safety data values from the external interface server 100, the display object designated to receive alarms or alerts from the controller 40 may receive alarms or alerts corresponding to only safety events.

In other embodiments, it may be desired for particular display object(s) to receive an alarm or alert corresponding to particular types of non-process events only when a particular threshold is reached. For example, it may be desired for a display object to receive an alarm or alert corresponding to a category 4 or above hurricane but not for a category 3 or below hurricane. In such an example, for particular display object(s) to receive an alarm or alert corresponding to particular types of non-process events from a designated controller (e.g., controller 40), the control module 70 or a function block within the control module 70 (e.g., NPE function block 502) of controller 40 may be configured to initially receive non-process event data values for particular types of non-process events (e.g., weather) or even all types of non-process events (e.g., weather, news, geological, political, safety, security) from the external interface server 100. As described with respect to FIG. 5, NPE 502 may be programmed with a setpoint value (e.g., a threshold severity value, a threshold location value, a threshold time value) so that the controller 40 may only pass through actual non-process event data values for the particular data value types that meet or exceed the setpoint value to the display object. Therefore, in this example, a display object configured to receive an alarm or alert corresponding to a hurricane may only receive an alarm or alert if the category of the hurricane exceeds 3, as established by the setpoint value having a value of 4, for example.

In embodiments described herein, the external interface server 100 may be configured to transmit non-process event data values for various data value types to all the controllers or select controllers. Transmitting non-process event data values to all controllers may necessitate each controller to determine whether alarms or alerts should be generated based on the received non-process event data values, in manners described above. However, if the external interface server 100 is configured to transmit non-process event data values to select controllers, the external interface server 100 may, at least in part, assist the select controllers in generating the alarm or alert on behalf of the select controllers. Particularly, the external interface server 100 may be configured to address the non-process event data values to particular controllers based on where the controllers are located. For instance, the external interface server 100 may be configured to address non-process event data values corresponding to a small chemical spill located at a south end of the plant to a controller located in the south end of the plant (e.g., and not to a controller located in the north end of the plant). The controller located in the south end of the plant may be communicatively coupled to a display object, that upon instantiation at an operator device that monitors activity within the south end of the plant, may alert an operator via an operator interface.

Figure 7:
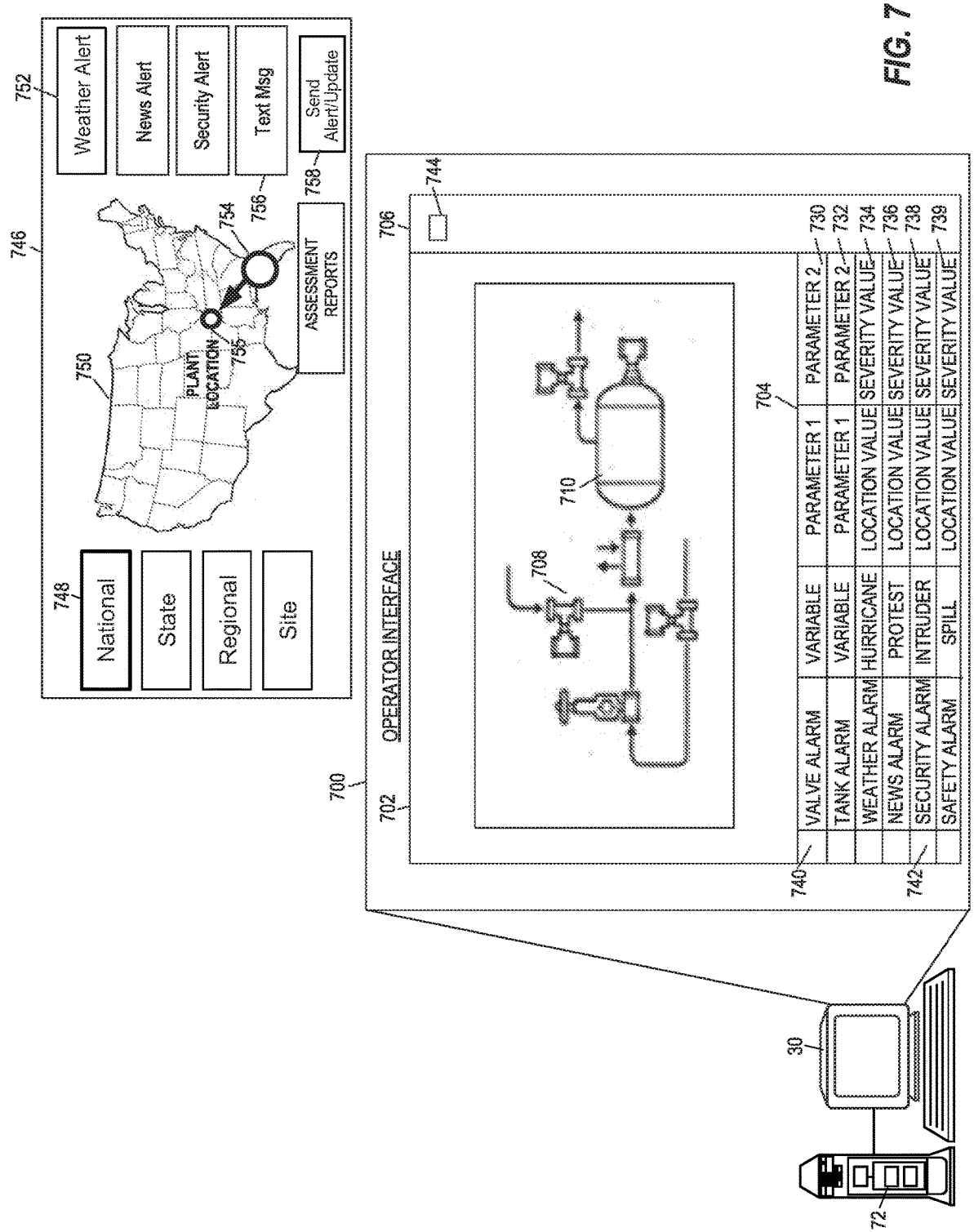
FIG. 7 is a graphical interface that may be displayed at an example operator device within the example process control environment.

Operator interfaces may be implemented on a system-wide basis or on an area basis in one or more of the operator devices 30, 32 and provide preconfigured operator interfaces to the operator or maintenance personnel regarding the operating state of the control system or portions thereof within the plant. For ease of illustration, an operator interface implemented on a system-wide basis resides on the operator device 30, whereas an operator interface implemented on an area basis resides on the operator device 32. As shown in FIG. 7, operator interfaces may generally take the form of control displays that include an alarm list (e.g., alarm display portion 704) that receives and displays alarms or alerts generated by controllers or devices within the process plant. The control displays also include other graphics (e.g., device operation display portion 702) indicating the operating state of field devices and other devices within the process plant. The operator interfaces enable operators to manage alarms or alerts corresponding to detected non-process events, adjust the process of detecting non-process events by entering new setpoints, respond to alarms or alerts by notifying other operator devices of the detected non-process events, and "zoom in" or "zoom out" on particular portions of a visual map displayed on the operator interface for further details about the detected non-process events, utilize other specialized applications related to the non-process event detection process being performed and controlled among other advantages and features.

A configuration engineer or other user may create or build one or more operator interfaces, for operators, maintenance personnel, etc. within the process plant by building display objects in a configuration environment (e.g., using the configuration application included in the suite of applications 71) that upon execution by the operator devices 30, 32, may display the operator interfaces.

Generally speaking, to build a display object corresponding to an operator interface, a configuration engineer may use a configuration application to visually connect numerous graphic components that reference particular hardware or physical entities (e.g., valve 708, a tank 710) and connector elements (e.g., pipes, lines, conveyor belts) to depict the interaction of the various physical entities and connector elements, as is known. The graphic components may include all of the properties (e.g., the unit or area of the plant the various physical entities and connector elements are assigned), parameters, actions and animations, user interface interactions, data manipulations, bindings (which define the manner in which the graphic components are tied to the particular hardware, connector elements, and other information defined elsewhere in the plant) of the particular physical entity and connector elements. In embodiments of the present invention, the graphic components may also be tied to non-process event information (e.g., non-process event data values, alarms or alerts corresponding to the non-process event data values) provided by the controller (e.g., controller 40). As such, a display object, in embodiments of the present invention, may be tied to non-process event information, which advantageously allows operator interfaces, upon execution, to display alarm or alerts corresponding to non-process events. For example, display objects 72, 73 may be tied to the alarm or alert, as well as non-process event data values, that are generated by any of control modules 500, 510, 520, 530, as illustrated in FIGS. 5 and 6.

In some situations, a configuration engineer may use the configuration application to create control modules that are reprogrammable with different setpoint values from an operator. For example, if the NPE function block 502 is initially programmed to include a setpoint value corresponding to a threshold severity value (e.g., category 3 hurricane), the operator may desire to reprogram the NPE function block 502 to update the setpoint value corresponding to a more conservative threshold severity value (e.g., category 2 hurricane). Therefore, when creating the control modules and display objects using the configuration application, the control modules may be configured to receive setpoint values from display objects over the communication lines or links, and display objects may be configured to transmit setpoint values to the control modules. In other words, even if the NPE function block 502 is initially programmed with a setpoint value, a display object 72 that is instantiated at the operator device 30 may be configured to send an updated setpoint value (illustrated as "SP values" in FIGS. 5 and 6) to the NPE function block 502 over the communication lines or links to overwrite the previously existing setpoint value with the updated setpoint value. As such, an operator at an operator device 30 may modify the initially configured setpoint value.

Once created, the display object 72 may be bound to and executed in a runtime environment on, for example, operator device 30 of FIG. 1 using, for example, the viewing application. In other words, after a display object is created and stored in the database 60, that display object may be instantiated as an actual runtime object and may be executed in the runtime environment. As such, an operator may view the operator interface that has been programmed or preconfigured in accordance with the display object. The instantiation process may fill in the bindings defined in the display object 72 in a resolution table that may be loaded with proper variable names, tags, aliases, non-process event data values, alarms, alerts, etc. within the process plant or process control system to provide a specific connection between actual entities within the process plant and the display object 72 running on the operator device 30 within the plant. As part of the binding process, the display object 72 thereby connects to data sources (e.g., control modules 70) within the process plant as defined by the resolution table to thereby gain access to the plant and to logically and communicatively connect the instantiated display object 72 to the process plant.

Display objects may be bound to the runtime environment only when called up or actually executed on a runtime computer (e.g., any of the operator devices 30, 32). That is, the resolution table for each of the instantiated objects is only filled in or bound to the runtime environment when the display object is actually running or being executed in the runtime computer. This procedure assures that the display object including its visualizations, controls, scripts, etc. only executes and thereby uses processing power when the visualization(s) of the display object are actually being rendered on a display screen.

Figure 10:
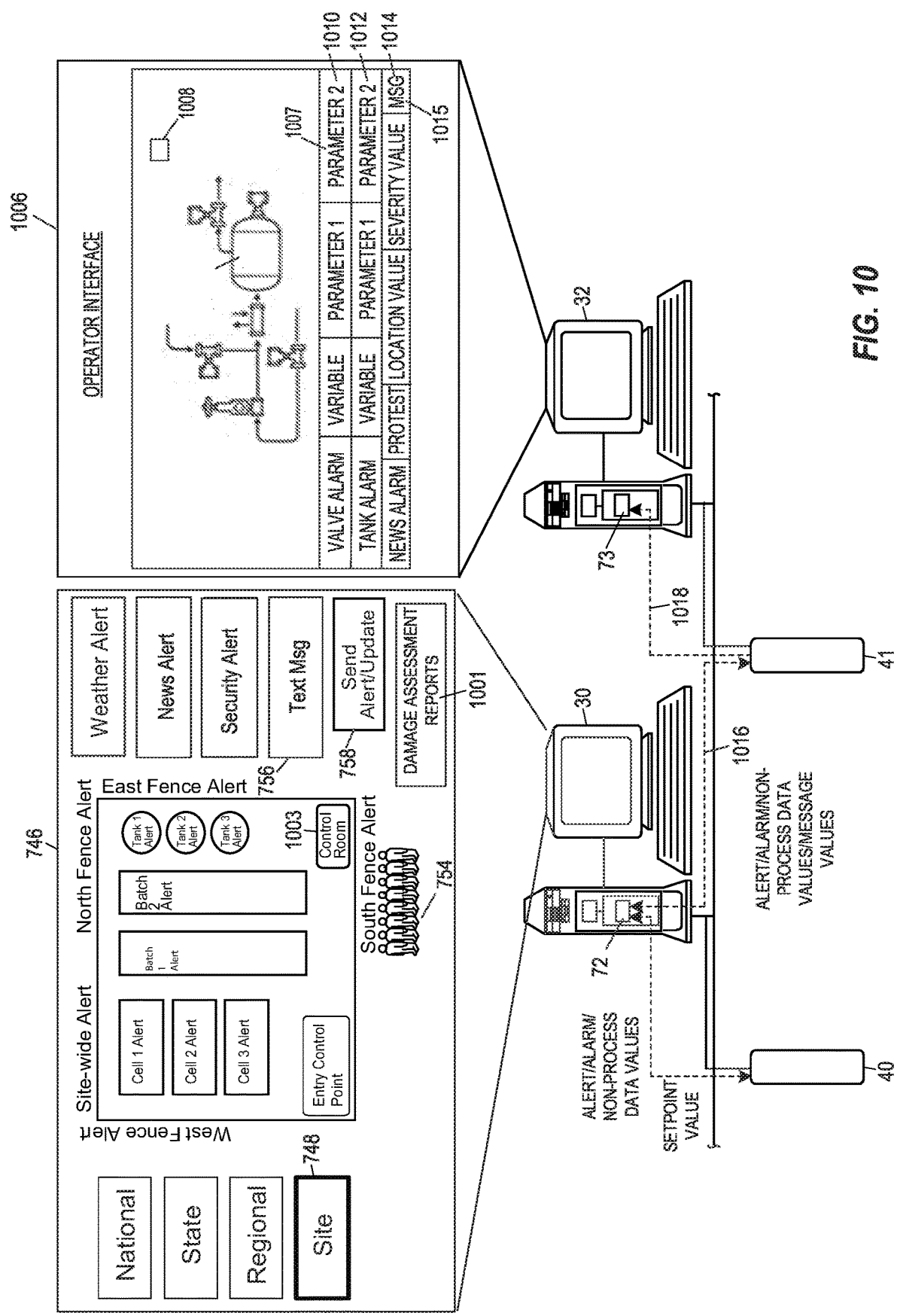
FIG. 10 depicts graphical interfaces that may be displayed at different operator devices within the example process control environment.

Because the operator interface is programmed or preconfigured in accordance with the display object 72, 73, and because display objects 72, 73 may be tied to the alarm or alert, as well as non-process event data values, instantiating display objects 72, 73 in the runtime environment may cause the operator devices 30, 32 to display operator interfaces (e.g., operator interface 700 of FIG. 7, operator interface 1006 of FIG. 10) having alarm display portions (e.g., the alarm display portion 704, 1007) that receive and display alarms or alerts, as well as non-process event data values, generated by control modules 500, 510, 520, 530. The alarm display portion 704 (and similarly alarm display portion 1007) may be organized into rows in some embodiments. In addition to rows 730, 732 that may indicate variables and parameters associated with process events as is known, embodiments of the present disclosure enable the depiction of rows 734, 736, 738, and 739 to indicate alarms or alerts, as well as non-process event data values associated with non-process events, for example. To differentiate the process event alarms from the non-process event alarms, different icons 740, 742 may be used to aid a visual search.

Instantiating the display object 72 in the runtime environment may also cause the operator device 30 to display the operator interface 700 having the device operation display portion 702 that also receives and displays alarms or alerts, as well as process event data values and non-process event data values, capable of being generated by control modules 500, 510, 520, 530. The device operation display portion 702 may render the graphic components that reference particular hardware or physical entities (e.g., valve 708, a tank 710) to simulate the interaction of the various physical entities, as is known. In this example, if the security data source 110 identifies that an intruder has been spotted at the plant, instantiation of the display object 72 that is configured to receive a security alarm or alert, severity value (e.g., intruder), and location value (e.g., near tank 710) from the control module 70 may render row 738 of alarm display portion 704

The configuration application may enable the display objects to be created at various levels of detail, to enhance the ease of use and the versatility of the display objects. For example, with respect to FIG. 7, for execution on a system-wide operator device 30, display object 72 may be programmed to display graphic 744 on the operator interface 700, such that upon selection of the graphic 744 by the site-wide operator, a window 746 is rendered. The window 746 may be rendered as a pop-up window overlaid on the device operation display portion 702 so as to hide a portion of the device operation display portion 702, as a window that is side-by-side with respect to the device operation display portion 702 so as to keep the entire portion of the device operation display portion 702 in view, or any other suitable arrangement with respect to the device operation display portion 702. The window 746 may allow the operator to view a map 750 and a graphic 754 associated with a non-process event superimposed on the map 750. The operator may notice that the position of the graphic 754 reflects that the non-process event may be near the plant. For instance, if a severe thunderstorm is detected by the weather data source 108, the graphic 754 may represent a thunderstorm. The window 746 may also include graphics 748 that upon selection, enable the operator to change abstraction levels of the map 750, from zoomed-in site-level details of the plant, to regional (e.g., municipal, county) or state level details, to fully zoomed-out national or even international level details. As shown, an operator may also select graphics 752 to view alarms or alerts for particular types of non-process events. For example, if the operator of a plant located in Illinois desires to only view any severe weather events that are occurring within the state of Illinois for example, the operator may select the graphic 748 corresponding to "State" and graphic 752 corresponding to "Weather Alert" so that window 746 may be rendered with graphic 754 associated with a weather event superimposed on a state-level view of the map 750 if a weather event (meeting criteria configured in the external interface server 100 and/or controller 40 if set) exists. In the example, graphic 754 corresponding to any other types of non-process events (e.g., political protests) occurring either in the state of Illinois or outside the state may not be superimposed on the state-level view of the map 750, if only the graphic 752 corresponding to "Weather Alert" is selected. Upon additional selection of the graphic 752 corresponding to "News Alert," and provided that a news event (meeting criteria configured in the external interface server 100 and/or controller 40 if set) exists in the state of Illinois, the window 746 may be updated to render another graphic 754 corresponding to the news event superimposed on the map 750. To enable the window 746 to autopopulate with map 750 and superimpose graphic 754 onto the map 750, the display object 72 may be configured to retrieve map information (e.g., town, city, county, state, country mapping data, latitude and longitude coordinates thereof) from a database (e.g., database 60) and autoplot the location value associated with the non-process event corresponding to the graphic 754.

The window 746 may also be configured to display the graphic 754 associated with a non-process event upon selection of any one of rows 734, 736, 738, or 739 of the alarm display portion 704. For example, selection of row 734 corresponding to details about a hurricane may display window 746 having graphic 754 graphically depicting a hurricane. Although FIG. 7, as shown, depicts display window 746 having several graphics 752 corresponding to "News Alert" and "Security Alert" for example, selection of row 734 corresponding to details about a hurricane may render a display window 746 that only includes graphic 752 related to alarms or alerts for weather events (i.e., excludes graphics 752 corresponding to "News Alert" and "Security Alert"). Selection of button 744 may revert the window 746 back to the window 746 as shown in FIG. 7 (i.e., includes graphics 752 corresponding to "News Alert" and "Security Alert"). As another example, selection of row 734 corresponding to details about a hurricane may display window 746 having graphics 752 corresponding to "Weather Alert," "News Alert," and "Security Alert" as shown, with graphic 752 corresponding to "Weather Alert" preselected by default. Because graphic 752 corresponding to "News Alert" and "Security Alert" are not selected by default, any graphics 752 related to alarms or alerts for news or security events may not appear on the map 750. In some embodiments, the display object 72 may be programmed to update the position of the graphic 754 with respect to the map 750 based on updated non-process event data values (e.g., location values, severity values, time values) received from the external event server 100 or controller 40 in real-time. Therefore, an operator may view and track the status of the non-process event in real-time on the operator interface 700.

In some situations, the operator of operator device 30 may desire operator device 32 to be on notice of the non-process event. For example, with reference to FIG. 10, upon selecting graphic 748 corresponding to "Site" in window 746, the window 746 of operator device 30 may display graphic 754 if the news data source 108 identifies that a political protest is occurring at the south fence area of the plant. The operator of the operator device 30 may determine that personnel assigned to control room 1003 may be unable to leave the plant through the south fence. Therefore, the operator may desire to alert the operator device 32 assigned in control room 1003. To do so, the operator may select a button 758 that is configured, via display object 72, to send an alarm update signal 1016, over the communication lines or links to a controller 41, which may include any one or more of the control modules described in FIGS. 5 and 6, which in turn may send, over the communication lines or links, an alarm or alert 1018 to display object 73 that is programmed to receive the alarm or alert 1018. For execution on operator device 32, display object 73 may be programmed to display operator interface 1006 having the alarm display portion 1007 that receives and displays alarms or alerts corresponding to process data values, as well as non-process event data values, generated by control modules 500, 510, 520, 530. The alarm display portion 1007 may be organized into rows in some embodiments. In addition to rows 1010, 1012 that may indicate variables and parameters associated with process events occurring in control room 1003 as is known, embodiments of the present disclosure enable the depiction of row 1014 to indicate alarms or alerts corresponding to non-process event data values, as well as non-process event data values associated with the political protest, as an example.

In some situations, an operator at the operator device 30 may desire to send a default or customized message to another operator at operator device 32. For example, the operator at the operator device 30 may desire to express, via text box 756, that the plant will be closed for 2 days in response to a large political event scheduled for 2 days, or that an intruder detected at the plant is carrying a weapon. To enable communication of the message between operator devices 30, 32, a configuration engineer may create control modules that are able to receive message values (illustrated as "message values" in FIGS. 5 and 6) from an operator at operator device 30, via display object 72, and transmit the message values to another operator at operator device 32, via display object 73. For example, with respect to FIG. 6, the display object 72 may be programmed to convert the message expressed in text box 756 into a message value having a format readable by the NPE function block 502, and the NPE function block 502 may be configured to receive the message value from display object 72. If necessary, the NPE function block 502 may reformat the message value into a suitable format usable by the display object 73, and in any event, transmit the message value to the display object 73. Of course, input function block 504 and output function block 506 may also assist the NPE function block 502 in receiving the message value from display object 72 and sending the message value to display object 73 in some embodiments. As such, in some embodiments, the display objects 72, 73 may be tied to non-process event information, including not only alarms, alerts, location values, safety or security values, and/or time values, but also values corresponding to a message. Upon instantiation of display object 73 at the operator device 32, message value 1015 corresponding to the content entered in text box 756 may populate in row 1014.

In some embodiments, an operator at the operator device 30 may desire to receive confirmation or other feedback data from the operator device 32 to assess the validity of the alarm or alert sent to the operator device 32. For example, the operator at the operator device 30 may desire to know whether a political protest actually occurred near the south fence, as had been indicated by display graphic 754. As another example, the operator may desire to know whether the protest is over. In such situations, display object 73 may be programmed to display graphic 1008 on the operator interface 1006, such that upon selection of the graphic 1008 by the operator at the operator device 32, a new window (not shown) with an entry field is rendered for the operator to input feedback data (e.g., confirmation that the political protest actually occurred near the south fence, the operator has notified other personnel assigned to control room 1003 about the political protest, assessment of any damages as a result of the political protest, etc.). When an operator selects graphic 1001 in window 746 at the operator device 30, the operator may view data corresponding to the feedback data input by the operator at the operator device 32.

Figure 8:
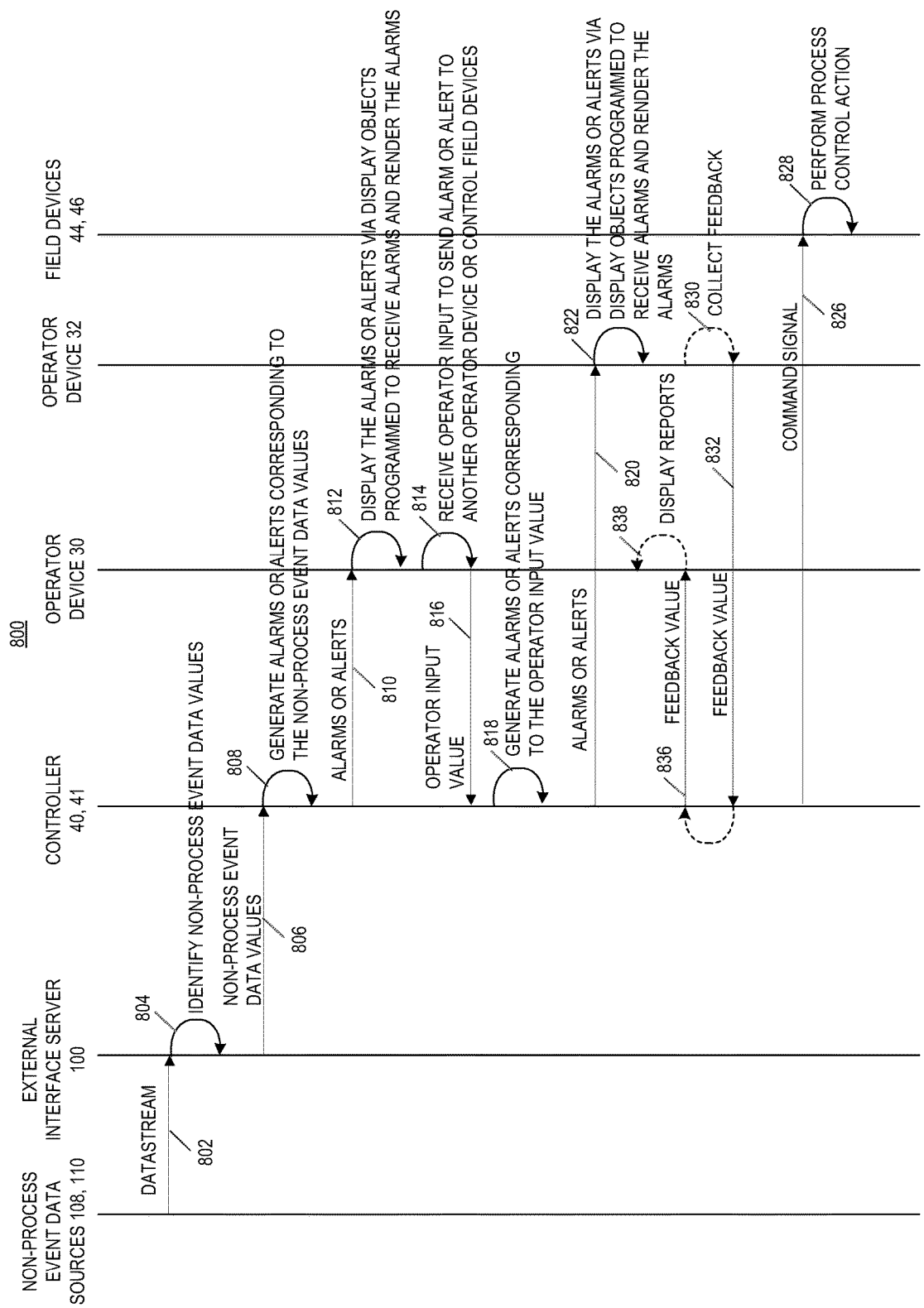
FIG. 8 is a flow diagram illustrating an example process in the example process control environment.

FIG. 8 is a flow diagram illustrating a method 800 carried out in the example process control system 10. Non-process event data sources 108, 110, such as a weather data source 108, a news data source 108, and a safety data source 110 or security data source 110 may transmit (802) datastreams to the external interface server 100. The external interface server 100 may receive the datastreams and process the datastreams, thereby generating non-process event data values. To process the datastreams, the external interface server 100 may execute a parsing application that parses a datastream to identify (804) particular non-process event data values, such as a precipitation value, temperature value, location value (e.g., from the weather data source 108), population density value, location value (e.g., from the news data source 108), or a safety or security data value (e.g., from the safety data source 110 or security data source 110). The external interface server 100 may also execute a filter application that compares the relevant non-process event data values identified by the parsing application to programmable thresholds. The external interface server 100 may transmit (806) the relevant non-process event data values to the controller 40, so that the controller 40 may generate (808) alarms or alerts corresponding to the non-process event data values. The controller 40 may then send (810) the alarm or alert to at least the operator device 30 so that an alarm or alert corresponding to a non-process event (e.g., non-process event data values) may appear at an operator screen of the operator device 30. The alarm or alert generated by the controller 40 is tied to a display object (e.g., display object 72), such that upon instantiation of the display object at the operator device 30, an operator may view the alarm or alert as it pertains to the plant. The display object 72 may be executed on the operator device 30 to receive data (e.g., alarm or alert, non-process event data values) from the controller 40 and display (812) or render this data in the form of one or more graphic elements on the operator screen at operator device 30.

The display object 72 may be programmed to send or receive information to or from another controller (e.g., controller 41), which in turn may be programmed to send or receive information to or from another display object (display object 73).

For example, upon receiving (814) operator input to send an alarm or alert to another operator device (e.g., operator device 32), the display object 72 may be configured to send (816) an operator input value corresponding to the alarm or alert to a controller configured to communicate with operator device 32 (e.g., controller 41). The controller 41 may receive and process the operator input value to generate (818) an alarm or alert usable by the operator device 32 (or more particularly, the display object 73 associated with the operator device 32). The controller 41 may send (820) the alarm or alert to the operator device 32, at which the alarm or alert is displayed (822) via display object (e.g., display object 73) programmed to receive and render the alarms or alerts at the operator device 32. Upon instantiation of the display object 73 at the operator device 32, plant personnel operating the operator device 32 may therefore view the alarm or alert.

As another example, upon receiving (814) operator input to control field devices 44, 46, the display object 72 may be configured to send (816) the operator input value corresponding to the alarm or alert to the one or more controllers 40, 41 configured to communicate with field devices 44, 46. The one or more controllers 40, 41 may issue and send (826) a command signal to the designated field device 44, 46 in accordance with the operator input value for the designated field device 44, 46 to perform (828) a process control action in accordance with the operator input value, such as shutting down the field devices 44, 46.

In some embodiments, the operator device 30 may generally be configured to receive feedback data from the operator device 32 in response to sending the operator input to operator device 32. Particularly, a user interface at the operator device 32 may be configured to collect feedback (e.g., an assessment as to whether the non-process event that gave rise to the alarm or alert actually occurred, and if the non-process event did occur, an assessment of the damages if any as a result of the non-process event) from an operator of the operator device 32. The operator device 32 may, via the display object 73, collect (830) feedback, generate a feedback value in a suitable format usable by the controller 41, and subsequently send (832) the feedback value to the controller 41. For example, controller 41 may, as illustrated in FIG. 5, include the input function block 504 of the control module 500 and receive the feedback value corresponding to the feedback from the operator device 32 (or more particularly, the display object 73 associated with the operator device 32) and reformat the feedback into a suitable format usable by the NPE function block 502 if necessary. The NPE function block 502 may process the feedback value, and the output function block 506 may send the feedback value or reformat the feedback value into a suitable feedback data usable by the operator device 30, more particularly the display object 72. Accordingly, the controller 41 may transmit (836) the feedback value to the operator device 30. Upon receiving the feedback value, the operator device 30 may display (838) reports corresponding to the feedback value, by selecting graphic 1001 in window 746 shown in FIG. 10, for example. Accordingly, the operator at the operator device 30 may view whether the non-process event that gave rise to the alarm or alert actually occurred, and if the non-process event did occur, the assessment reports may show damages if any as a result of the non-process event.

Scenarios

Several non-limiting scenarios will be illustrated herein to demonstrate the method 800 described in FIG. 8.

Chemical Spill

To incorporate a system for tracking and responding to a safety event like a chemical spill inside the process plant, a safety data source 110, such as a computer dedicated for use by plant personnel associated with maintaining safety at the plant, may transmit a datastream including safety data to the external interface server 100. For example, if a user observes a chemical spill, the user may manually report any information concerning the chemical spill (e.g., location of the chemical spill, time of the spill) by interacting with a web-based interface (e.g., intranet website) or other suitable interface on the computer. As another example, the computer may receive signals from various sensors installed at various areas of the plant, each sensor configured to detect various characteristics of a chemical spill (e.g., radiation levels). Accordingly, the datastream provided by the safety data source 110 may include the location of the chemical spill, the dangers or risk of the spill, and/or other suitable data. Of course, other safety data sources and safety events are contemplated as described herein. Other non-limiting examples of a safety data source 110 may include a sensor system, server, or any suitable computing device. Non-limiting examples of the safety datastream may be a raw data stream, an encoded data stream, a transcription, an audio file, a live stream, a multimedia stream, or data transmission associated with a fire, product spills, or worker mishaps that result in injuries, or an on-site accident.

The external interface server 100, particularly processor 206, may receive the datastream and process the datastream, thereby identifying and generating non-process event (i.e., safety) data values, such as location values (e.g., the location value of the chemical spill) and severity values (e.g., the dangers or risk values of the spill). In this scenario, the external interface server 100 may not need to be equipped with a filter application, since the safety data values indicating a safety event within the plant may already be highly relevant to the plant. Upon receiving the safety data values for the chemical spill, the controller 40 may generate alarms or alerts corresponding to the safety data values. Specifically, as described with respect to FIG. 5, control module 500 or 530 may receive the safety data values to generate an alarm or alert for the chemical spill.

The controller 40 may then send the alarm or alert to at least the operator device 30 so that an alarm or alert corresponding to the chemical spill may appear at an operator screen of the operator device 30. To enable such communication to the operator device 30, display object 72 tied to the alarm or alert at the operator device 30 may be programmed to receive information from the controller 40. Upon instantiation of the display object 72, with reference to FIG. 7, the operator device 30 may display operator interface 700 having row 739 displayed in the alarm display portion 704. Row 739 may display details about the chemical spill corresponding to the location value of the chemical spill and/or the dangers or risk values of the chemical spill. In other embodiments, the operator interface 700 may include graphic 744, that when selected, displays window 746 that may allow the operator to view a map 750 at the site level to view a graphic 754 associated with the chemical spill.

If the operator desires to notify plant personal assigned at portions of the plant to evacuate or simply to be put on notice of the chemical spill, the operator may enter a text message in text box 756 or use a prepopulated text message, or simply select button 758 to send an alarm update signal 1016 to the controller 41, which in turn may send an alarm or alert 1018 to display object 73 that is programmed to receive the alarm or alert 1018 at an operator device (e.g., operator device 32) located at the assigned portions of the plant.

If the operator at operator device 30 desires to shut down field devices at the plant as a precautionary measure against the chemical spill, the operator may similarly provide an operator input value (to send the alarm or alert via the alarm update signal 1016) to the one or more controller 40, 41 that controls the desired field devices, particularly to the PC function block 604 as shown in FIG. 6, for example, which in turn may issue shut-down commands readable by the field devices 44, 46.

Intruder

Figure 9:
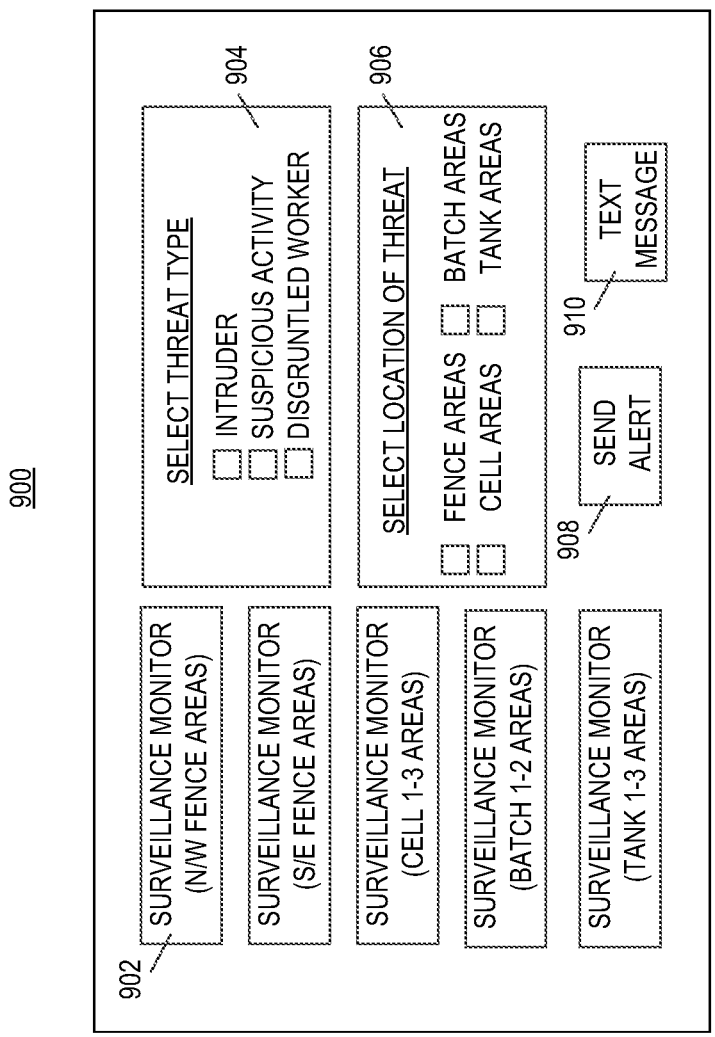
FIG. 9 depicts graphical interfaces that may be displayed at an example security data source.

In another example scenario, to incorporate a system for tracking and responding to a security threat like an intruder inside the process plant, a security data source 110, such as a surveillance system dedicated for use by a security guard or other personnel, may transmit a datastream including security data to the external interface server 100. The surveillance system may be configured to automatically detect the intruder (e.g., via cameras, perimeter detectors, and/or motion detectors installed in various areas in the plant) and/or receive a manual input via a user interface (e.g., web-based user interface) by the security guard or other personnel when the security guard or other personnel notices that an intruder has been identified, to generate the security data for transmittal to the controller 40, which in turn may generate an alarm or alert corresponding to the detected intruder. As illustrated in FIG. 9, the surveillance system having a security operator interface 900 may be configured with surveillance display monitors 902 that each receive feeds from cameras and/or motion detectors installed at various portions (e.g., fence areas, cell areas, batch areas, tank areas, etc.) of the plant. The security guard or other user may interact with the security operator interface 900 that displays activity (e.g., recording of image, video) captured by the surveillance display monitors 902 in real-time. As such, when a security guard or other user observes a security threat on one of the surveillance display monitors 902, the security guard may identify the threat using any input means (e.g., using a keyboard, using a mouse, using drop-down menus or buttons, voice activation, etc.) and send security data to the external interface server 100. Upon noticing the intruder or other security event, the security guard or other user may select the type of security threat (e.g., intruder, disgruntled workers, suspicious activity, suspicious package, etc.) in field 904, the location of the security threat in field 906, and/or provide any additional information about the security event (e.g., that an intruder is armed) in field 910. Upon selection of an alarm or alert button 908, the security data source may transmit a datastream including security data corresponding to any of the data provided in fields 904, 906, and/or 910, to the external interface server 100.

The external interface server 100, particularly processor 206, may receive the security data and process the security data, using an API to aid the processing of the security data, thereby identifying and generating security event data values (e.g., the threat type value, location value, keywords in the text message, etc.). In this scenario, the external interface server 100 may not need to be equipped with a filter application, since the security data values indicating a security threat within the plant may already be highly relevant to the plant. Upon receiving the security data values for the security threat, the controller 40 may generate alarms or alerts corresponding to the security data values. Specifically, as described with respect to FIG. 5, control module 500 or 530 may receive the security data values to generate an alarm or alert for the security threat.

The controller 40 may then send the alarm or alert to at least the operator device 30 so that an alarm or alert corresponding to the security threat may appear at an operator screen of the operator device 30. To enable such communication to the operator device 30, display object 72 tied to the alarm or alert at the operator device 30 may be programmed to receive alarms or alerts from the controller 40 to display the alarm or alert onto interfaces (e.g., operator interface 700, window 746, and operator interface 1006 of FIG. 10) when instantiated on operator device 30. Upon instantiation of the display object 72, with reference to FIG. 7, the operator device 30 may display operator interface 700 having row 738 displayed in the alarm display portion 704. Row 738 may display details about the intruder corresponding to the threat type value, location value, keywords, etc. In some embodiments, the operator interface 700 may include graphic 744, that when selected, displays a new window on the operator screen, as shown in the window 746 of FIG. 9. For instance, if the security guard sent an alarm or alert indicating that an intruder is at the North Fence of the plant via security operator interface 900, the window 746 may display the "North Fence Alert" graphic 754 or other suitable graphic depicting an intruder superimposed on the site map 914. Accordingly, the display object 72 may be programmed to change a graphic (e.g., graphic 754) on the window 746 based on input from the security guard.

Hurricane

In another example scenario, to incorporate a system for tracking and responding to a weather event like a hurricane, a weather data source 108, such as a weather surveillance radar (WSR) that provides weather and/or storm updates, may transmit a datastream including weather information to the external interface server 100. The datastream may include the location of the hurricane, the category of the hurricane, the directional trajectory of the hurricane, the expected time the storm is expected to hit a particular location, and/or other suitable weather data. Of course, other weather data sources and weather events are contemplated. For example, non-limiting examples of a weather data source 108 may be a Doppler weather radar, lightning detector, temperature sensor, weather website (e.g., Allison-House™, The Weather Channel®), a content delivery client that provides weather activity multimedia, a dedicated weather blog, a dedicated weather video blog, a dedicated weather television station, or a dedicated weather radio station. Non-limiting examples of the weather datastream may be a raw data stream, an encoded data stream, a transcription, an audio file, a live stream, a multimedia stream, or data transmission associated with rain, snow, hail, visibility, lightning, thunder, winds, tornadoes, cyclones, flooding, monsoon, and temperature.

The external interface server 100, particularly processor 206, may receive the datastream and process the datastream, thereby identifying and generating non-process event (i.e., weather) data values, such as location values (e.g., the location value of the hurricane) and severity values (e.g., the category value of the hurricane, the directional trajectory value of the hurricane). If the external interface server 100 is equipped with the parsing application 214, the processor 206 may execute the parsing application 214 to parse the datastream and identify the weather data values. For example, if the datastream is a multimedia stream including video footage of Hurricane Irma, the parsing application 214 may exhibit a video processing algorithm to analyze the video footage and/or metadata tied to the video footage to detect a severity value (e.g., by estimating the winds from the video footage and estimating the category of a hurricane) and a location value (e.g., by identifying a recognized landmark from the video footage or recognizing the location value from the metadata tied to the video footage). If the external interface server 100 is also equipped with the filter application 216, the processor 206 may execute the filter application 216 to compare the identified weather data values to programmable thresholds. For instance, if the location value for a hurricane is "Florida" and the location of the plant is in "California," the external interface server 100 may not transmit the weather data values for the hurricane to the controller 40. If the location of the plant is within a threshold distance (e.g., 1000 miles) away from Florida, the external interface server 100 may transmit the weather data values for the hurricane to the controller 40 if the plant is located in Georgia. Similarly, if the severity value of the hurricane is determined to be a "category 5 hurricane," the external interface server 100 may transmit the weather data values for the hurricane to the controller 40, as the severity value exceeds a threshold category (e.g., category 2 and above). The external interface server 100, particularly processor 206, may transmit the location value (e.g., character string of "Florida," equivalent bit string, etc.) and severity value (e.g., character string of "category 5," equivalent numerical representation, etc.) to the controller 40. As such, controller 40 may advantageously only need to generate alarms for filtered weather data values, thereby reducing data transfer. Upon receiving the weather data values for the hurricane, the controller 40 may generate alarms or alerts corresponding to the weather data values. Specifically, as described with respect to FIG. 5, control module 500 or 520 may receive the weather data values to generate an alarm or alert for the hurricane.

The controller 40 may then send the alarm or alert to at least the operator device 30 so that an alarm or alert corresponding to the hurricane may appear at an operator screen of the operator device 30. To enable such communication to the operator device 30, display object 72 tied to the alarm or alert at the operator device 30 may be programmed to receive information from the controller 40. Upon instantiation of the display object 72, with reference to FIG. 7, the operator device 30 may display operator interface 700 having row 734 displayed in the alarm display portion 704. The row 734 may display details about the hurricane corresponding to the location value and/or severity value identified by the external interface server 100 and/or controller 40. In some embodiments, the operator interface 700 may include graphic 744, that when selected, displays window 746 that may allow the operator to view a map 750 at the national level or other selected level to view a graphic 754 associated with the hurricane relative to the location 755 of the plant.

If the operator at operator device 30 desires to shut down field devices at the plant, the operator may similarly provide an operator input value (to send the alarm or alert via the alarm update signal 1016) to the one or more controller 40, 41 that controls the desired field devices to control, particularly to the PC function block 604 as shown in FIG. 6, for example, which in turn may issue shut-down commands readable by the field devices 44, 46. Alternatively, the one or more controller 40, 41 may be configured to automatically shut down field devices based on certain types of alerts (e.g., security alerts) and not for other types of alerts (e.g., political protest alerts). For example, the one or more controller 40, 41 may automatically issue shut-down commands readable by the field devices 44, 46 upon generating alarms or alerts corresponding to security data values, but may not automatically issue shut-down commands readable by the field devices 44, 46 upon generating alarms or alerts corresponding to political protest data values.

Political Protest

In another example scenario, to incorporate a system for tracking and responding to a news event like a political protest, a news data source 108, such as an XML-based encoded website that provides data for the political protest, may transmit a datastream including news information to the external interface server 100. The datastream may include the location of the political protest, the crowd density of the political protest, the directional trajectory of the political protest, the scheduled time of the protest, and/or other suitable political protest data, among other newsworthy (non-political protest) data. Of course, other news data sources and news events are contemplated. For example, non-limiting examples of a news data source 108 may be a news website, a content delivery client that provides streams of news multimedia, a dedicated news blog, a dedicated news video blog, a dedicated news television station, or a dedicated news radio station. Non-limiting examples of the news data may be a raw data stream, an encoded data stream, a transcription, an audio file, a live stream, a multimedia stream, or data transmission associated with suspicious activity, terror activity, special organized events, road closings, public transportation delays, or traffic. The news data source 108 may also be a data aggregator, such as an online service configured to collect news data from any of the non-process event sources 108 described herein or other data source. For instance, the news data source 108 may aggregate geological data associated with geological activity (earthquake, a tsunami, a wildfire, a coastal flood, a coastal tide, a volcanic eruption, an agricultural burning, a landslide) from a geological activity data source (e.g., geological remote sensor, a seismometer, a geological activity website).

The external interface server 100, particularly the processor 206, may receive the datastream and process the datastream, thereby identifying and generating non-process event (i.e., news) data values, such as location values (e.g., the location value of the political protest), severity values (e.g., the crowd density value of the political protest, the directional trajectory value of the political protest), and time values (e.g., scheduled time of the protest). If the external interface server 100 is equipped with the parsing application 214, the processor 206 may execute the parsing application 214 to parse the datastream and identify the news data values. For example, if the datastream is an RSS feed including news relevant to the safety of the plant (e.g., a political protest) and other news irrelevant to the safety of the plant news events (e.g., a basketball team winning a championship), the parsing application 214 may exhibit an API to aid the processing of the RSS feed and a computer algorithm configured to detect mark-ups in the RSS feed and identify the select content immediately prior to or subsequent to the detected mark-ups. For instance, if the algorithm identifies "political protest" and "championship" from the RSS feed, the algorithm may ignore the portion of the RSS feed dedicated to the "championship" content and identify "political protest" and other affiliated news data values, such as a severity value (e.g., by identifying the crowd density value of the political protest from the RSS feed) and a location value (e.g., by identifying the location value of the political protest from the RSS feed). If the external interface server 100 is equipped with a filter application, the filter application may compare the identified news data values to programmable thresholds. For instance, if the location value for the political protest is "Orlando, Fla." and the location of the plant is in San Francisco, Calif., the external interface server 100 may not transmit the news data values for the political protest to the controller 40. If the location of the plant is within a threshold distance (e.g., 5 miles) away from Tampa, Fla., the external interface server 100 may transmit the news data values for the political protest to the controller 40 if the plant is also located in Tampa, Fla. Similarly, if the severity value of the political protest demonstrates a high crowd density value (e.g., 1000 people per unit area), the external interface server 100 may transmit the news data values for the political protest to the controller 40, as the severity value exceeds a threshold category (e.g., 50 people per unit area).

The external interface server 100, particularly the processor 206, may transmit the location value (e.g., character string of "Tampa, Fla.," equivalent bit string, etc.) and severity value (e.g., character string of "1000 people per unit area," equivalent numerical representation, etc.) to the controller 40. As such, the controller 40 may advantageously only need to generate alarms for qualified news data values, thereby reducing data transfer. Upon receiving the news data values for the political protest, the controller 40 may generate alarms or alerts corresponding to the news data values. Specifically, as described with respect to FIG. 5, in some embodiments in which a single control module may be configured to receive the news data values, the NPE function block 502 may sort the news data values based on the respective type of news to generate respective alarms or alerts. Therefore, if the controller 40 receives political protest data values (e.g., the location value of the "political protest") and sports data values (e.g., the location value for a scheduled "game"), the NPE function block 502 may prioritize generating alarms or alerts for the political protest data values over generating alarms or alerts for the sports values using a keyword-based sorting function according to the type of news events, for example. In other embodiments in which dedicated control modules may be configured to receive news data values, the control module 510 may receive the news data values to generate an alarm or alert for the political protest.

The controller 40 may then send the alarm or alert to at least the operator device 30 so that an alarm or alert corresponding to the political protest may appear at an operator screen of the operator device 30. To enable such communication to the operator device 30, display object 72 tied to the alarm or alert at the operator device 30 may be programmed to receive information from the controller 40. Upon instantiation of the display object 72, with reference to FIG. 7, the operator device 30 may display operator interface 700 having row 736 displayed in the alarm display portion 704. The row 736 may display details about the political protest corresponding to the location value of the political protest, the crowd density value of the political protest, the directional trajectory value of the political protest, and/or the scheduled time. In some embodiments, the operator interface 700 may include graphic 744, that when selected, displays window 746 that may allow the operator to view a map 750 at the national level or other selected level (e.g., state) to view a graphic 754 associated with the political protest relative to the location 755 of the plant.

If the operator at operator device 30 desires to notify other plant personal assigned at portions of the plant to shut down the plant or simply to be put on notice of the political protest, the operator may enter a text message in text box 756 or use a prepopulated text message, or simply select button 758 to send an alarm update signal 1016 to the controller 41, which in turn may send an alarm or alert 1018 to display object 73 that is programmed to receive the alarm or alert 1018 at an operator device (e.g., operator device 32) located at the assigned portions of the plant. Alternatively, upon selecting button 758, an alarm update signal 1016 may be transmitted to the display object 73 directly. Accordingly, one or more display objects described herein may be configured to receive the alarm update signal to display a text message at an operator device.

Figure 11:
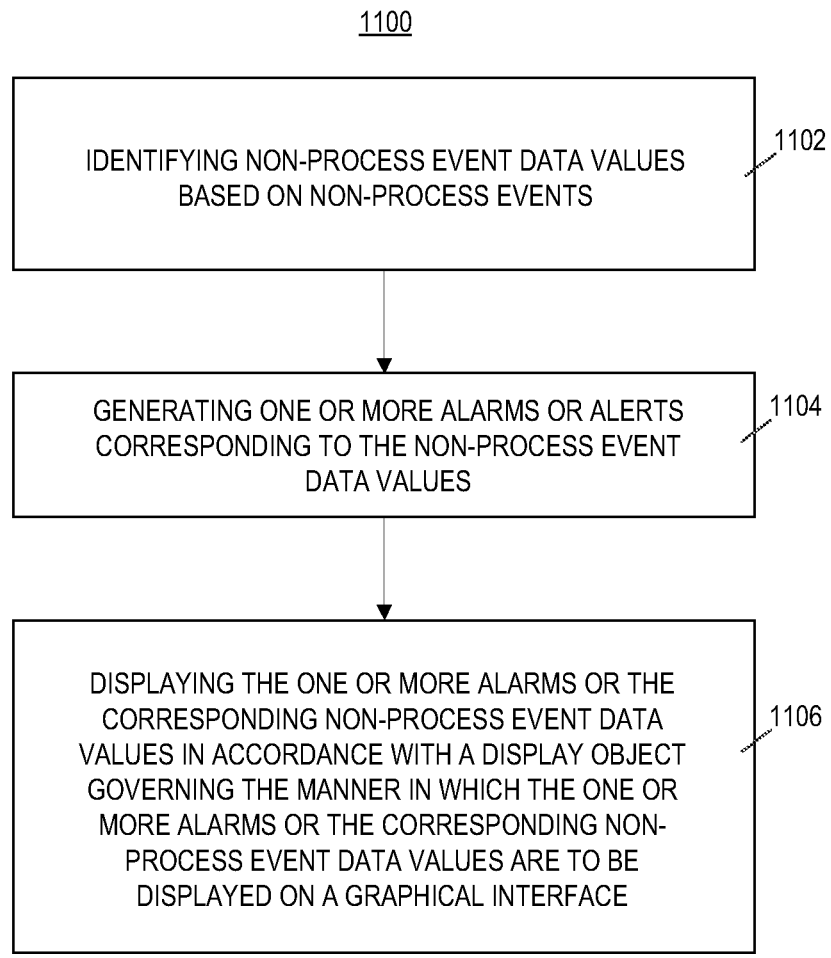
FIG. 11 is a flow diagram illustrating an example process carried out by the example process control environment.

Turning now to FIG. 11, a method 1100 illustrating an example process carried out by a process control system (e.g., process control system 10 shown in FIG. 1) is provided. The method 1100 begins by identifying non-process event data values based on non-process events (block 1102). The process control system 10 may utilize external interface server 100 to identify non-process event data values based on non-process events, such as weather events, geological events, political events, news events, safety events, security events, or any suitable non-process event. The method 1100 proceeds by generating one or more alarms or alerts corresponding to the non-process event data values (block 1104). The process control system 10 may utilize controller 40 to generate one or more alarms or alerts corresponding to the non-process event data values. In some embodiments, controller 40 may be configured with setpoints, such that alarms or alerts are generated only if the non-process event data values are evaluated to meet or exceed the setpoints or other criteria (e.g., exceed the setpoints by a particular amount, below the setpoints, etc.). In other embodiments, controller 40 may receive non-process event data values from external interface server 100 that have already been evaluated. The method 1100 proceeds by displaying the one or more alarms or alerts or the corresponding non-process event data values at an operator device in accordance with a display object (block 1106). The display object may govern the manner in which the one or more alarms or alerts or the corresponding non-process event data values are to be displayed on an operator interface. Operator device 30 of the process control system 10 may execute display object 72 to display the one or more alarms or alerts or the corresponding non-process event data values that gave rise to the alarms or alerts at the operator interface of the operator device 30.

Figure 12:
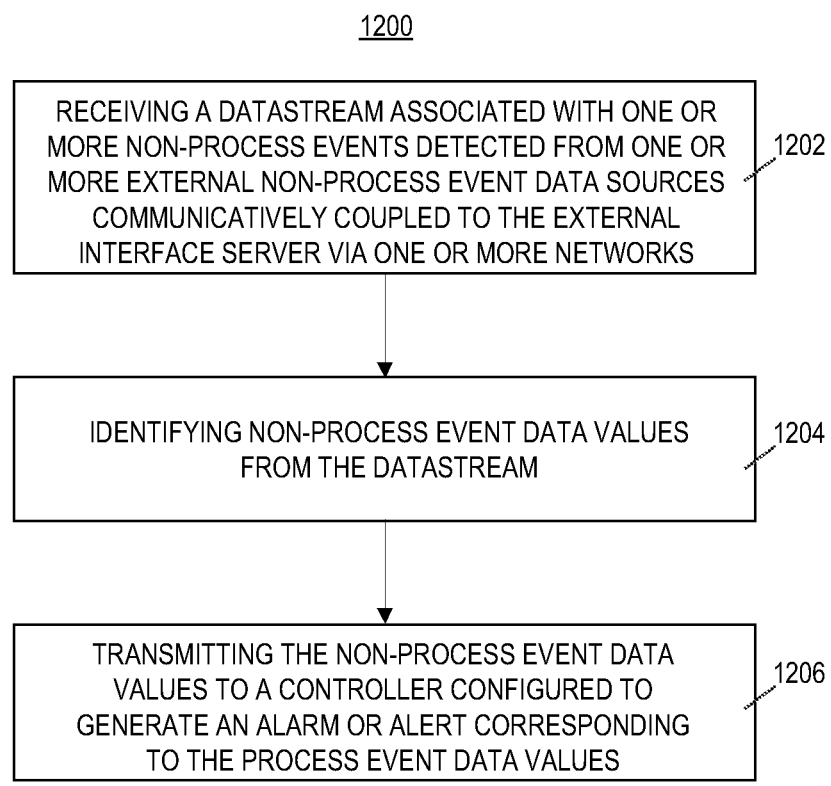
FIG. 12 is a flow diagram illustrating an example process carried out by the example external interface server.

Turning now to FIG. 12, a method 1200 illustrating an example process carried out by an external interface server (e.g., external interface server 100 shown in FIG. 2) is provided. The method 1200 begins by receiving a datastream associated with one or more non-process events detected from one or more external non-process event data sources communicatively coupled to the external interface server 100 via one or more networks (block 1202). The external interface server 100 may be configured to receive datastreams from a weather data source, news data source, a geological activity data source, a political data source, or a safety data source or security data source. Particularly, a configuration engineer may utilize interface 300 illustrated in FIG. 3 to assist in linking the non-process event data sources with the external interface server 100, as well as configuring the types of data to be received at the external interface server 100. The method 1200 proceeds by identifying non-process event data values from the datastream (block 1204). For instance, the external interface server 100 may identify a location value (e.g., "California"), severity value (e.g., "Category 5"), and time value (e.g., scheduled to arrive at "5 pm") for a hurricane from a weather data source, or a location value (e.g., "North Area Fence") and severity value (e.g., "intruder with weapon") for an intruder detected around the premise of the plant from a security data source. To further describe a method of identifying non-process event data values from the datastream, FIG. 13 illustrates a method 1300 carried out by the external interface server 100.

Figure 13:
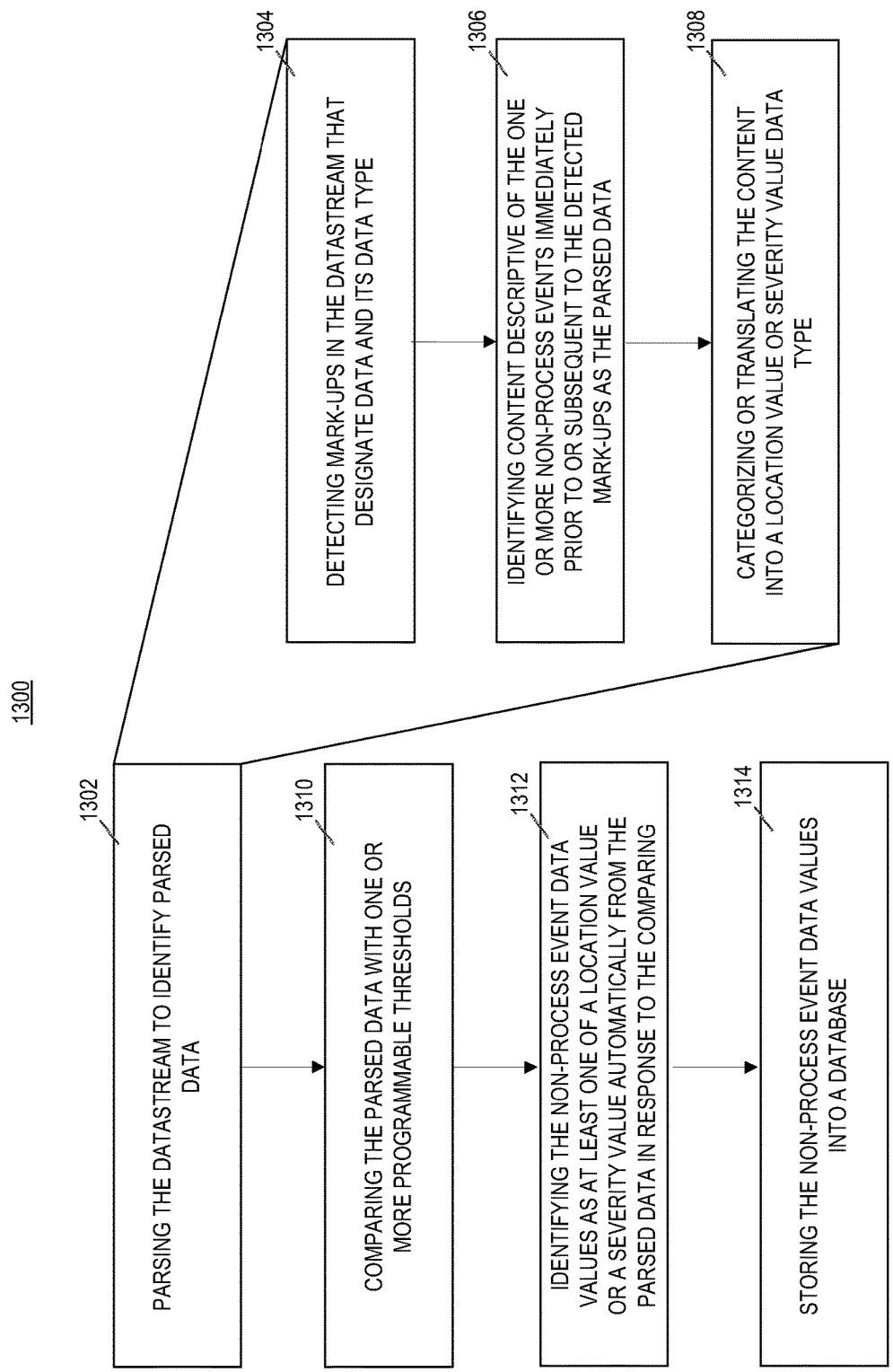
FIG. 13 is a flow diagram illustrating an example process carried out by the example external interface server.

Turning now to FIG. 13, the method 1300 begins by parsing the datastream to identify parsed data (block 1302). In one embodiment, the external interface server 100 may execute a parsing application 214 that parses a datastream to identify parsed data. The parsing application 214 may detect mark-ups in the datastream that designate data and its data type (block 1304), identify content descriptive of the one or more non-process events immediately prior to or subsequent to the detected mark-ups as the parsed data (block 1306), and categorize or translate the content into a location value or severity value data type (block 1308). For instance, the parsing application 214 may detect mark-ups (e.g., a hash tag) in a Twitter® feed (e.g., "# SupportPoliticalCandidate # NorthCarolina Expecting a large crowd to show up tonight at 8 pm!") to identify parsed data (e.g., "location_value=NC," "severity_value=low," "time_value=2000). As another example, the parsing application 214 may detect other mark-ups (e.g., an XML tag) in a newsfeed (e.g., "<Title> Powerful Hurricane Irma damages California") to identify parsed data (e.g., "location_value=CA," "severity_value=high").

In some embodiments, the method 1300 proceeds by comparing the parsed data with one or more programmable thresholds designated by one or more setpoint values (block 1310), and subsequently identifying the non-process event data values as at least one of a location value, a severity value, or a time value automatically from the parsed data in response to the comparing (block 1312). The external interface server 100 may execute a filter application 216 that compares the non-process event data values identified by the parsing application 214 to the programmable thresholds. For instance, if the location setpoint value corresponds to "North Carolina," the severity setpoint value corresponds to "large" and the time setpoint value corresponds to "1800," the parsed data of "location_value=NC," "severity_value=low," "time_value=2000" may not meet the threshold setpoint values for a plant located in North Carolina because the time_value of "2000" (e.g., 8 pm) is later than the time setpoint value corresponding to "1800" (e.g., 6 pm). Therefore, a political event scheduled to take place at 8 pm, which may be after operation hours of the plant, may not prompt generation of an alarm or alert to display at the operator device 30. If the time_value component of the parsed data had been a value earlier than the time setpoint value corresponding to "1800," such as "1700," the parsed data would have met the threshold setpoint values, and accordingly, the political event scheduled to take place at 5 pm, which may typically be a time when personnel leave the plant to go home, may prompt generation of an alarm or alert to display at the operator device 30.

Lastly, the method 1300 proceeds by storing the non-process event data values into a database (block 1314). In this way, the database (e.g., database 212) may store non-process event data values corresponding to non-process events that are relevant (i.e., affect the safety or security of the plant) to the process control system 10 of a process plant, such as the political protest scheduled to occur close to the time at which personnel leave to go home. Accordingly, the database 212 may not store non-process event data values corresponding to non-process events that are less relevant or not relevant to the process control system 10 of a process plant, such as a hurricane 4000 miles away in California, for example, as such non-process events do not affect the safety or security of the plant.

Turning back to FIG. 12, the method 1200 proceeds by transmitting the non-process event data values to a controller configured to generate an alarm or alert corresponding to the process event data values (block 1206). To further describe a method of generating an alarm or alert corresponding to the process event data values, FIG. 14 illustrates a method 1400 carried out by the controller 40.

Figure 14:
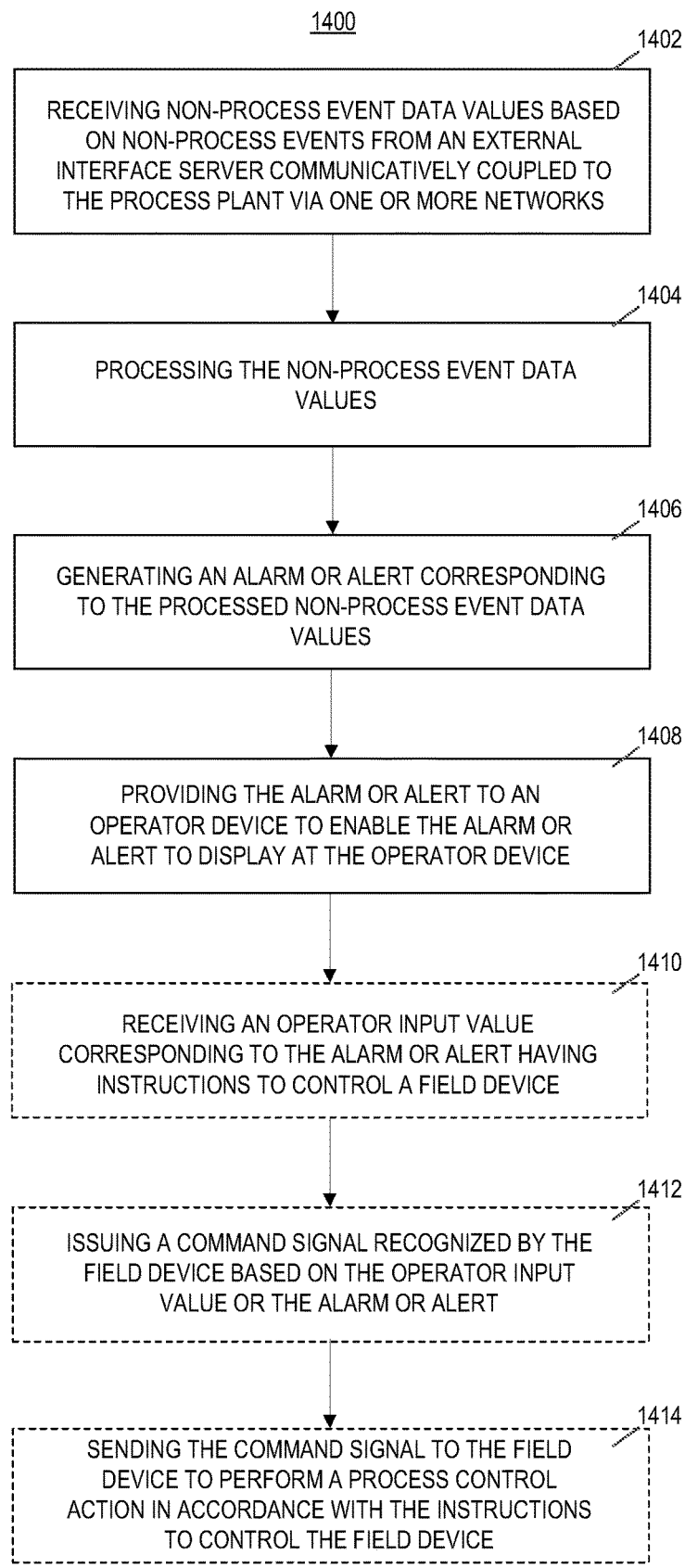
FIG. 14 is a flow diagram illustrating an example process carried out by the example controller.

Turning now to FIG. 14, a method 1400 illustrating an example process carried out by a controller 40 is provided. The method 1400 begins by the controller 40 receiving non-process event data values based on non-process events from an external interface server communicatively coupled to the process plant via one or more networks (block 1402). In some embodiments, the filter application 216 may have filtered the non-process event data values received from the external interface server 100. In other embodiments, the non-process event data values may be the parsed data that has not been filtered. In any event, the method 1400 proceeds by processing the non-process event data values (block 1404). In embodiments in which the non-process event data values have been filtered, the controller 40 may simply pass along the non-process event data values to a control module 70 that generates alarms or alerts corresponding to processed non-process event data values (block 1406). However, in embodiments in which the non-process event data values have not been filtered, the controller 40 may be configured with functionality similar to the filter application 216 of the external interface server 100. As described with respect to FIG. 5 for example, the NPE function block 502 may be configured with one or more programmable setpoint values to compare the non-process event data values identified by the external interface server 100 to the one or more programmable setpoint values. For example, the external interface server 100 may have identified non-process event data values for a magnitude 8 earthquake based on a datastream from a geological activity data source (e.g., "location_value=CA," "severity_value=8, "). If the NPE function block 502 is configured with a location setpoint value corresponding to "California," and a severity setpoint value corresponding to "5," the NPE function block 502 may pass along the non-process event data values after comparing the values to the setpoint values, since the magnitude 8 earthquake in California meets or exceeds the threshold magnitude 5 earthquake in California. Therefore, the detected earthquake may prompt the controller 40 to generate an alarm or alert, and to provide the alarm or alert to an operator device to enable the alarm or alert to display at the operator device (block 1408). Had the non-process event data value identified by the external interface 100 been "severity_value=2," the non-process event data value would not have met the threshold setpoint values, and accordingly, a magnitude 2 earthquake in California may not prompt the controller 40 to generate an alarm or alert to display at the operator device 30.

In some embodiments, the controller 40 may exclusively perform the filtering functionality, whereas in other embodiments, the controller 40 and external interface server 100 may share the filtering functionality (e.g., after the external interface server 100 preliminarily filters the non-process event data values based on one criteria, the filtered non-process event data values may be provided to controller 40 for another stage of filtering based on another criteria).

In some embodiments, if the operator at operator device 30 desires to communicate the alarm or alert displayed on the operator interface to another operator device (e.g., operator device 32), the operator device 30, via display object 72 executing on the operator device 30, may send an operator input value to a controller 41 that is configured to communicate with the operator device 32 via display object 73 executing on the operator device 32. To further describe a method of sending an operator input value to a controller 41, FIG. 15 illustrates a method 1500 carried out by the controller 41.

Figure 15:
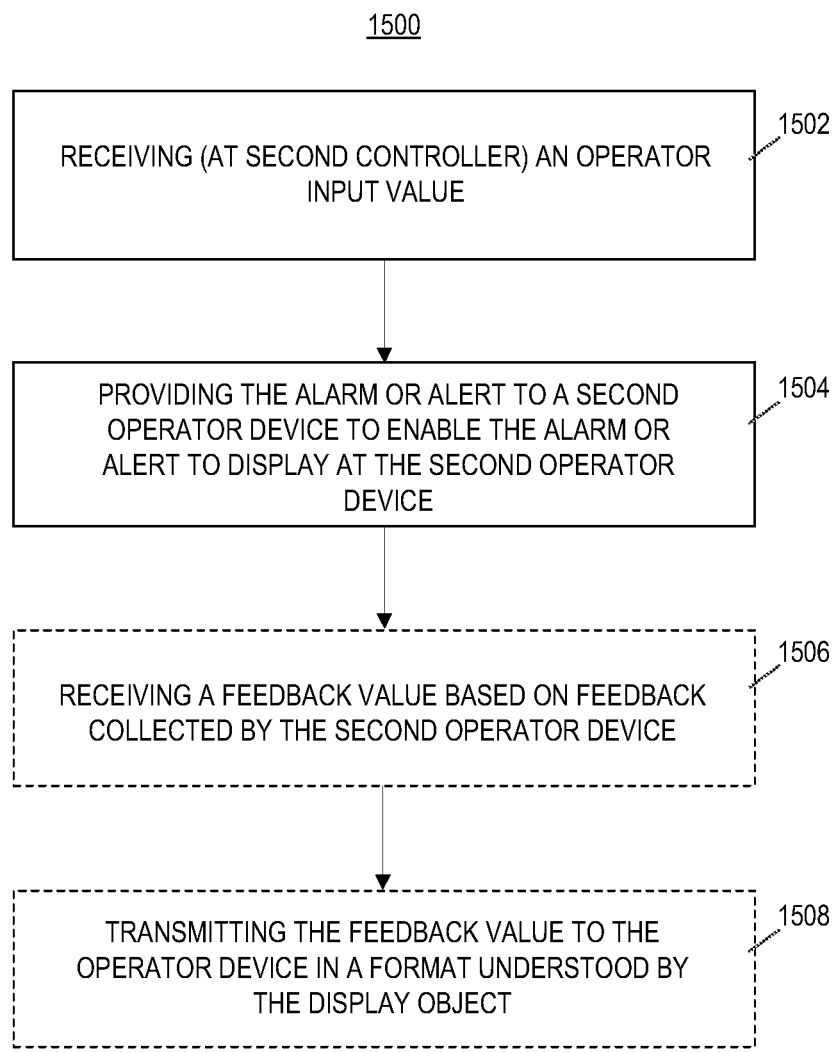
FIG. 15 is a flow diagram illustrating an example process carried out by the example controller.

Turning now to FIG. 15, a method 1500 illustrating an example process carried out by a controller 41 is provided. The method 1500 begins by the controller 41 receiving an operator input value (block 1502). The operator input value may include an identifier of a destination operator device (e.g., identification number, serial number, model number, etc.) and the alarm or alert corresponding to non-process event data values. The method 1500 proceeds by providing the alarm or alert to the destination operator device to enable the alarm or alert to display at the destination operator device (block 1504). The destination operator device (e.g., operator device 32) may display the alarms or alerts in a similar manner in which the operator device 30 displays alarms or alerts received from controller 40. That is, operator device 32 may execute display object 73 that is configured to receive and display the alarms or alerts when instantiated on the operator interface of the operator device 32.

In some embodiments, the method 1500 proceeds by receiving a feedback value based on feedback collected by the second operator device (block 1506). The feedback value may be generated when an operator at the destination operator device indicates a certain procedure via the operator interface in response to the alarm or alert. For instance, the operator may indicate that personnel were notified and that they have evacuated the plant. As another example, the operator may indicate that the alarm or alert may be a false alarm or alert because the non-process event that gave rise to the alarm or alert did not occur near the plant. The display object 73 may be configured to send a preconfigured feedback value (e.g., "00" for a successful evacuation, "01" for a false alarm) to the controller 41, which in turn, may communicate the feedback value to display object 72 configured to display the feedback value to the operator of operator device 30. Accordingly, the method 1500 may transmit the feedback value to the operator device (e.g., operator device 30) in a format usable by the display object 72 (block 1508).

Turning back to FIG. 14, in some embodiments, if the operator at operator device 30 desires to control field devices in response to the detected non-external event, the method 1400 proceeds by receiving an operator input value corresponding to the alarm or alert having instructions to control a field device (block 1410). The instructions may be to shut down a field device, or to otherwise adjust the manner in which the field device operates in response to the detected non-process event. The method 1400 proceeds by issuing a command signal recognized by the field device (block 1412) based on the operator input value or the alarm or alert. The method 1400 proceeds by sending the command signal to the field device to perform a process control action in accordance with the instructions to control the field device (block 1414).

While only certain embodiments have been set forth, alternative embodiments in various modifications will be apparent from the above description to those skilled in the art. These and other alternatives are considered equivalents and within the spirit and scope of this disclosure.

What is claimed:

1. A process control system of a process plant, the process control system comprising:
    one or more networks;
    an external interface server communicatively coupled to the one or more networks, the external interface server configured to identify non-process event data values based on non-process events received from one or more non-process event data sources;
    a controller communicatively coupled to the one or more networks and a field device in the process plant, the controller configured to:
        generate one or more alarms or alerts corresponding to the non-process event data values identified by the external interface server; and
        subsequently generate, based on the one or more alarms or alerts, a command signal for controlling the field device; and
    an operator device communicatively coupled to the one or more networks, the operator device configured to display the one or more alarms or alerts or the corresponding non-process event data values in accordance with a display object governing a manner in which the one or more alarms or alerts or the corresponding non-process event data values are to be displayed on an operator interface of the operator device.

2. The process control system of claim 1, wherein the one or more non-process event data sources comprise at least one of a weather data source, news data source, a geological activity data source, a political data source, safety data source, or a security data source.

3. The process control system of claim 2, wherein the one or more alarms or alerts corresponding to the non-process event data values are displayed on a second operator device in accordance with a second display object governing a manner in which the one or more alarms or alerts are to be displayed on an operator interface of the second operator device.

4. The process control system of claim 3, wherein the one or more alarms or alerts corresponding to the non-process event data values are displayed on the operator device via the display object or the second operator device via the second display object according to at least one of particular data types corresponding to the non-process event data values or particular types of the non-process events.

5. The process control system of claim 2, wherein the external interface server is configured to identify the non-process event data values by parsing non-process event data streams received from the one or more non-process event data sources.

6. The process control system of claim 5, wherein the external interface server is further configured to evaluate whether the non-process event data values are relevant to safety and/or security conditions of the process plant by comparing the non-process event data values to one or more programmable thresholds.

7. The process control system of claim 5, wherein the controller is further configured to evaluate whether the non-process event data values are relevant to safety and/or security conditions of the process plant by comparing the non-process event data values to one or more programmable thresholds.

8. The process control system of claim 7, wherein the controller is configured to generate one or more alarms or alerts only for corresponding non-process event data values evaluated to be relevant.

9. The process control system of claim 1, wherein the one or more alarms or alerts are configured to be displayed at an alarm display portion of the operator interface at the operator device in accordance with the display object.

10. The process control system of claim 9, wherein the alarm display portion is configured to display alarms or alerts corresponding to process event data.

11. The process control system of claim 9, wherein the non-process event data values are configured to be displayed at the alarm display portion of the operator interface at the operator device in accordance with the display object.

12. The process control system of claim 9, wherein the non-process event data values are configured to be displayed on a visual map of the operator interface at the operator device in accordance with the display object, wherein the visual map is indexed to a plurality of abstraction views.

13. A process control method of a process plant carried out by a process control system, the method comprising:

identifying non-process event data values based on non-process events received from one or more non-process event data sources;

generating one or more alarms or alerts corresponding to the non-process event data values;

generating, based on the one or more alarms or alerts, a command signal for controlling a field device; and at least one of:

displaying the one or more alarms or alerts or the corresponding non-process event data values at an operator device in accordance with a display object governing a manner in which the one or more alarms or alerts or the corresponding non-process event data values are to be displayed on an operator interface of the operator device; or send the command control signal to the field device.

14. The process control method of claim 13, wherein the one or more non-process event data sources comprise at least one of a weather data source, news data source, a geological activity data source, a political data source, safety data source, or a security data source.

15. The process control method of claim 14, wherein the one or more alarms or alerts corresponding to the non-process event data values are displayed on a second operator device in accordance with a second display object governing a manner in which the one or more alarms or alerts are to be displayed on an operator interface of the second operator device.

16. The process control method of claim 15, wherein the one or more alarms or alerts corresponding to the non-process event data values are displayed on the operator device via the display object or the second operator device via the second display object according to at least one of particular data types corresponding to the non-process event data values or particular types of the non-process events.

17. The process control method of claim 14, wherein identifying the non-process event data values comprises parsing non-process event datastreams received from the one or more non-process event data sources.

18. The process control method of claim 17, further comprising:

evaluating whether the non-process event data values are relevant to safety and/or security conditions of the process plant by comparing the non-process event data values to one or more programmable thresholds.

19. The process control method of claim 18, further comprising:

generating one or more alarms or alerts only for corresponding non-process event data values evaluated to be relevant.

20. The process control method of claim 13, wherein the one or more alarms or alerts are configured to be displayed at an alarm display portion of the operator interface at the operator device in accordance with the display object.

21. The process control method of claim 20, wherein the alarm display portion is configured to display alarms or alerts corresponding to process event data.

22. The process control method of claim 20, wherein the non-process event data values are configured to be displayed at the alarm display portion of the operator interface at the operator device in accordance with the display object.

23. The process control method of claim 20, wherein the non-process event data values are configured to be displayed on a visual map of the operator interface at the operator device in accordance with the display object, wherein the visual map is indexed to a plurality of abstraction views.

* * * * *